US007577597B1

(12) United States Patent
Allison et al.

(10) Patent No.: US 7,577,597 B1
(45) Date of Patent: Aug. 18, 2009

(54) SYSTEM FOR FINANCIAL PLANNING

(75) Inventors: Suzanne S. Allison, Baltimore, MD (US); Joseph P. Healy, Baltimore, MD (US); Phillip Liebes, Baltimore, MD (US); James M. Surguine, Laurel, MD (US)

(73) Assignee: T. Rowe Price Associates, Inc., Baltimore, MD (US)

( * ) Notice: Subject to any disclaimer, the term of this patent is extended or adjusted under 35 U.S.C. 154(b) by 0 days.

(21) Appl. No.: 09/393,024

(22) Filed: Sep. 9, 1999

(51) Int. Cl.
*G06Q 40/00* (2006.01)
(52) U.S. Cl. .............................. 705/35; 705/36; 705/40; 705/41; 705/42; 235/379; 235/380
(58) Field of Classification Search .................... 705/35, 705/36, 40–42; 235/379, 380
See application file for complete search history.

(56) References Cited

U.S. PATENT DOCUMENTS

| | | | | |
|---|---|---|---|---|
| 5,689,649 | A | 11/1997 | Altman et al. ............... | 395/236 |
| 5,692,233 | A | 11/1997 | Garman ........................ | 705/36 |
| 5,745,706 | A | 4/1998 | Wolfberg et al. ............ | 395/235 |
| 5,764,923 | A | 6/1998 | Tallman et al. .............. | 395/203 |
| 5,774,881 | A | 6/1998 | Friend et al. ................. | 705/36 |
| 5,787,404 | A | 7/1998 | Fernandez-Holmann ..... | 705/35 |
| 5,864,828 | A | 1/1999 | Atkins ......................... | 705/36 |
| 5,903,881 | A * | 5/1999 | Schrader et al. .............. | 705/42 |
| 5,999,918 | A * | 12/1999 | Williams et al. .............. | 705/36 |
| 6,018,722 | A * | 1/2000 | Ray et al. ..................... | 705/36 |
| 6,021,397 | A * | 2/2000 | Jones et al. ................... | 705/36 R |
| 6,985,880 | B1 * | 1/2006 | Hodgdon et al. .............. | 705/36 T |

FOREIGN PATENT DOCUMENTS

JP 2002140560 * 5/2002

OTHER PUBLICATIONS

Daily, G.S., "How to Choose a Life Insurance Policy", Journal of Financial Planning; Denver; Apr. 1994; vol. 7, No. 2, p. 71, 5pgs.*
Stam, A., and Silva, P., "Stochastic judgments in AHP: The Measurement of Rank Reversal Probabilities", Decision Sciences; Atlanta; Summer 1997; vol. 28, No. 3.*
Gershom, M., "The Role of Weights and Scales in the Application of Multiobjective Decision Making", European Journal of Operational Research; Amsterdam; Feb. 1984; vol. 15, No. 2.(Abstract only).*
Von Nitzsch, R. and Weber, M., "The Effect of Attribute Ranges on Weights in Multattribute", Management Science; Providence; Aug. 1993; vol. 39, No. 8 (Abstract Only).*
"AIQ System Announces Release of Trading Expert Pro Version 5.0 Utilizing Real-Time Quotes", Business Wire; New York; Nov. 12, 1998.*

(Continued)

*Primary Examiner*—Daniel S. Felten
(74) *Attorney, Agent, or Firm*—Venable LLP; Michael A. Sartori; Steven J. Schwarz

(57) ABSTRACT

A system for financial planning is disclosed. The system determines at least one financial strategy for assets to meet financial goals. The system determines an outcome for each of a plurality of financial strategies and selects at least one of the financial strategies to meet the financial goals using a software-implemented decision analysis and the outcomes for the financial strategies.

32 Claims, 17 Drawing Sheets

OTHER PUBLICATIONS

"Track Data and Colt Internet to Offer Unique Continuously Updated Internet Price Service in Europe"; Business Wire; New York; Nov. 11, 1998.*
"Track Data and Track Securities Announced Today Plans to Provide my Trade Users With On-Line Trading Services" Business Wire; New York; Dec. 30, 1998.*
"Track Data Announces Its AIQ Systems Division Released Its Option Analysis Software Product—Option Expert" Business Wire; New York; Nov. 9, 1999.*
"AIQ Systems Announces Release of Trading Expert Pro Version 5.0 Utilizing Real-Time Quotes", Business Wire New York; Nov. 12, 1998.*
AIQ Website (http://aiqsystems.com/optionexperte.htm).*
Whinston, Andrew, Efficient Selection of Suppliers over the Internet, Spring 1997, Journal of Management Information Systems, vol. 13, Issue, p. 7/14.*
Merriam Webster's Collegiate 10th Edition, definition of "heuristic", 1999, Merriam Webster, p. 545.*
P.L. Bernstein, *Against the Gods: The Remarkable Story of Risk*, John Wiley & Sons, 1996.
J. Gilbert et al., "Investing for Retirement", *Smart Money*, Dec. 1998, pp. 105-119.
"For Every Client, A Thousand Futures", *Inside Information*, Nov. 1998, pp. 6-10.
C. Cordaro, "Using Monte Carlo Simulations For Retirement Planning," *Retirement Planning*, Jul.-Aug. 1998, pp. 39-44.
J. Clements, "After Scrimping to Build a Nest Egg, Brace Yourself for Withdrawal Angst", *The Wall Street Journal*, Jun. 2, 1998.
P. Cooley et al., "Retirement Savings: Choosing A Withdrawal Rate That is Sustainable", *AAII Journal*, Feb. 1998, pp. 16-21.
S. Hinden, "When It's Time to Retire the Long-Term Strategy," *The Washington Post*, Jan. 18, 1998.
W. Bengen, "Conserving Client Portfolios During Retirement, Part III", *Journal of Financial Planning*, Dec. 1997, pp. 84-97.
W. Bengen, "Allocating Assets in Retirement", *NAPFA Advisor*, May 1996, pp. 6-13.
N. Jeffrey, "Safe but Sorry: Insurers Push 'Immediate' Annuities", *The Wall Street Journal*, Mar. 29, 1996, p. C1 and C27.
J. Pond, "Secrets of Successful Retirement Planning", *Bottom Line*, Feb. 15, 1996, pp. 7-8.
J. Clements, "Can Retirement Savings Last 30 Years? Here's a Reality Check on Withdrawals", *The Wall Street Journal*, Feb. 3, 1996, p. C1.
W. Bengen, "Determining Withdrawal Rates Using Historical Data", *Journal of Financial Planning*, Oct. 1994, pp. 171-180.
L. Hopewell, "From the Editor", Journal of Financial Planning, Jan. 1994, p. 3.
L. Bierwith, "Investing for Retirement: Using the Past To Model The Future", *Journal of Financial Planning*, Jan. 1994, pp. 14-24.
"Interactive Financial Planning Solutions: Where Investors and Advisors Meet on the 'Net," FinancialPlanAuditors.com, 2 pages, downloaded from www.fplanauditors.com on Aug. 3, 1999.
"Part 2 of Form ADV," Financial Engines Advisors L.L.C., 29 pages, downloaded from www.financialengines.com in Jun. 1999.
"Where does my Forecast come from?—an interview with Bill Sharpe," Financial Engines Investor Resource Center, 3 pages, downloaded from www.financialengines.com in Jun. 1999.
"In the News," Financial Engines, Inc., 1999, 8 pages, downloaded from www.financialengines.com on Jun. 18, 1999.
"Will I have enough money when I retire?" Financial Engines, Inc., 1999, 2 pages, downloaded from www.financialengines.com on Jun. 18, 1999.
"What specific investments should I buy?" Financial Engines, Inc., 1999, 2 pages, downloaded from www.financialengines.com on Jun. 18, 1999.
"Privacy and security," Financial Engines, Inc., 1999, 1 page, downloaded from www.financialengines.com on Jun. 18, 1999.
"Test drive the Advisor," Financial Engines, Inc., 1999, 1 page, downloaded from www.financialengines.com on Jun. 18, 1999.
"Financial Engines to Provide Internet-Based Advice for Individuals," Financial Engines, Inc. Press Release, Feb. 23, 1998, 3 pages, downloaded from www.financialengines.com on Jun. 18, 1999.
"Financial Engines' Investment Advisor™ Now Available for 401(k) Plan Participants," Financial Engines, Inc. Press Release, Oct. 26, 1998, 3 pages, downloaded from www.financialengines.com on Jun. 18, 1999.
"Retirement Income Value: What does the retirement income value represent?" Financial Engines, Inc, 1 page, downloaded from www.financialengines.com on Jun. 18, 1999.
"Risk Slider: What does the risk number mean?" Financial Engines, Inc, 1 page, downloaded from www.financialengines.com on Jun. 18, 1999.
"Determining Funds: What historical data does Financial Engines use in its estimates and fund recommendation?" Financial Engines, Inc, 1 page, downloaded from www.financialengines.com on Jun. 18, 1999.
"Forecast Calculation: How is my Forecast calculated?" Financial Engines, Inc, 1 page, downloaded from www.financialengines.com on Jun. 18, 1999.
"Creating your Forecast," Financial Engines, Inc, 1 page, downloaded from www.financialengines.com on Jun. 18, 1999.
"Cross section of an economic scenario," Financial Engines, Inc, 2 pages, downloaded from www.financialengines.com on Jun. 18, 1999.
"Analyzing your portfolio," Financial Engines, Inc, 1 page, downloaded from www.financialengines.com on Jun. 18, 1999.
"Estimating your annual retirement income," Financial Engines, Inc, 2 pages, downloaded from www.financialengines.com on Jun. 18, 1999.
"Bringing it all together," Financial Engines, Inc, 1 page, downloaded from www.financialengines.com on Jun. 18, 1999.
"Can you do better?" Financial Engines, Inc, 1 page, downloaded from www.financialengines.com on Jun. 18, 1999.
"See how the Advice services works," Financial Engines, Inc, 1 page, downloaded from www.financialengines.com on Jun. 18, 1999.

* cited by examiner

| | 0 | 1 | 2 | 3 | 4 | 5 | 6 | 7 | 8 | 9 | 10 | N/A |
|---|---|---|---|---|---|---|---|---|---|---|---|---|
| Financial Goal: Amount of desired monthly pretax income | | | | | | | | | | | | |
| 1. What is the minimum pretax income you hope to receive your assets? | | $1,500 | | | | | | | | | | |
| Financial Goal: Achieve desired monthly income | | | | | | | | | | | | |
| 2. How important is that your assets generate at least this amount of income each month? | | | X | | | | | | | | | |
| Financial Goal: Achieve lifetime income | | | | | | | | | | | | |
| 3. How important is it to never run out of income from your assets? | | | | | | | | | | | | X |
| Financial Goal: Provide a survivor annuity | | | | | | | | | | | | |
| 4. If there is a co-client, how important is it that the survivor have an income annuity? | | | | | | | | | | | | X |
| Financial Goal: Desired ending balance | | | | | | | | | | | | |
| 5. How much of your assets would you like to have left at the end of your retirement? | Whatever is left → | | | X | Specific amount → | | $ | | | | | |
| Financial Goal: Achieve desired ending balance | | | | | | | | | | | | |
| 6. If you indicated a specific amount in question 5, how important is it that this amount is left at the end of your retirement? | | | | | | | | | | | | X |
| Financial Goal: Maintain a large reserve | | | | | | | | | | | | |
| 7. How important is it to maintain a large investment reserve throughout your retirement? | | | | | | | | X | | | | |
| Financial Goal: Preserve principal | | | | | | | | | | | | |
| 8. How important is it to preserve as much as possible of the original amount you invest? | | | | X | | | | | | | | |
| Financial Goal: Keep control of your investments | | | | | | | | | | | | |
| 9. How important is it that you have the freedom to change your investment strategy at any time? | | | | | | | | | | X | | |
| Financial Goal: Avoid market volatility | | | | | | | | | | | | |
| 10. How important is it that you minimize the exposure of your assets to stock market volatility? | | | | X | | | | | | | | |

Figure 8

| | 75 |
|---|---|
| 40 present value income | $1,120 |
| 41 % assets not annuitized | 70% |
| 42 liquid wealth | $465,293 |
| 43 dollars guaranteed | $322 |
| 44 likeliehood of success | 90% |
| 45 bear bull spread | 0.80% |
| 46 expected value of income | $1,031 |
| 47 expected loss | -34.22% |
| 48 semi-standard deviation | 7.81% |
| 49 standard deviation | 11.70% |
| 50 average balance | 135.88% |
| 51 inflation adjusted balance | 96.08% |
| 52 % assets not annuitized | 70% |
| 53 average final balance | $690,505 |
| 54 terminal assets | N/A |
| 55 % annuity income | 34.58% |
| 76 utility score | 0.723510 — 77 |

Figure 10

PREFERENCE LANDSCAPE AT 0% ANNUITIZATION

| Certainty | 99% | 95% | 90% | 85% | 80% | 75% | 70% | Requested |
|---|---|---|---|---|---|---|---|---|
| Portfolio 1 | $1,050<br>$170,924<br>0.635469<br>99.0% / 614 | $1,085<br>$149,109<br>0.637332<br>95.0% / 607 | $1,155<br>$106,532<br>0.640406<br>90.0% / 597 | $1,190<br>$86,206<br>0.639905<br>85.0% / 599 | $1,190<br>$86,206<br>0.637544<br>80.0% / 606 | $1,225<br>$67,236<br>0.636272<br>75.0% / 610 | $1,225<br>$67,236<br>0.633640<br>70.0% / 619 | $1,500<br>$1,447<br>0.580320<br>3.8% / 652 |
| Portfolio 2 | $1,085<br>$231,762<br>0.642671<br>99.0% / 585 | $1,155<br>$186,321<br>0.647183<br>95.0% / 566 | $1,190<br>$164,031<br>0.647361<br>90.0% / 562 | $1,260<br>$121,226<br>0.648281<br>85.0% / 554 | $1,295<br>$101,026<br>0.646796<br>80.0% / 575 | $1,295<br>$101,026<br>0.644303<br>75.0% / 582 | $1,330<br>$82,523<br>0.642151<br>70.0% / 588 | $1,500<br>$21,543<br>0.610053<br>26.2% / 647 |
| Portfolio 3 | $1,120<br>$270,329<br>0.647381<br>99.0% / 561 | $1,190<br>$224,194<br>0.651416<br>95.0% / 530 | $1,225<br>$201,524<br>0.651417<br>90.0% / 529 | $1,295<br>$158,231<br>0.652161<br>85.0% / 522 | $1,295<br>$158,231<br>0.649801<br>80.0% / 543 | $1,330<br>$137,614<br>0.648182<br>75.0% / 556 | $1,365<br>$118,260<br>0.646049<br>70.0% / 577 | $1,500<br>$58,654<br>0.630204<br>45.6% / 630 |
| Portfolio 4 | $1,050<br>$376,301<br>0.639693<br>99.0% / 602 | $1,155<br>$305,954<br>0.649264<br>95.0% / 545 | $1,260<br>$238,079<br>0.654267<br>90.0% / 507 | $1,295<br>$216,252<br>0.653602<br>85.0% / 509 | $1,330<br>$195,039<br>0.652434<br>80.0% / 519 | $1,365<br>$174,750<br>0.650803<br>75.0% / 534 | $1,400<br>$155,293<br>0.648692<br>70.0% / 552 | $1,500<br>$107,561<br>0.641081<br>56.8% / 595 |
| Portfolio 5 | $1,015<br>$412,273<br>0.632679<br>99.0% / 623 | $1,155<br>$318,608<br>0.647114<br>95.0% / 568 | $1,225<br>$273,161<br>0.650233<br>90.0% / 542 | $1,295<br>$229,198<br>0.651622<br>85.0% / 525 | $1,330<br>$208,114<br>0.650517<br>80.0% / 539 | $1,365<br>$187,750<br>0.648950<br>75.0% / 550 | $1,400<br>$168,399<br>0.646914<br>70.0% / 571 | $1,500<br>$119,925<br>0.639876<br>57.4% / 600 |
| Portfolio 6 | $1,050<br>$476,478<br>0.636753<br>99.0% / 608 | $1,155<br>$400,677<br>0.645820<br>95.0% / 573 | $1,260<br>$327,139<br>0.652454<br>90.0% / 518 | $1,330<br>$280,115<br>0.653509<br>85.0% / 511 | $1,365<br>$257,457<br>0.652284<br>80.0% / 521 | $1,400<br>$235,632<br>0.650618<br>75.0% / 537 | $1,435<br>$214,487<br>0.648505<br>70.0% / 553 | $1,500<br>$178,150<br>0.645882<br>64.8% / 578 |
| Portfolio 7 | $1,050<br>$556,479<br>0.634600<br>99.0% / 617 | $1,155<br>$475,521<br>0.644953<br>95.0% / 580 | $1,260<br>$396,758<br>0.650956<br>90.0% / 533 | $1,330<br>$345,986<br>0.652296<br>85.0% / 520 | $1,365<br>$321,570<br>0.651228<br>80.0% / 531 | $1,435<br>$274,566<br>0.650427<br>75.0% / 540 | $1,470<br>$252,298<br>0.648229<br>70.0% / 555 | $1,500<br>$233,866<br>0.648047<br>69.4% / 557 |
| Portfolio 8 | $1,050<br>$631,646<br>0.632016<br>99.0% / 627 | $1,155<br>$545,999<br>0.642578<br>95.0% / 587 | $1,260<br>$462,455<br>0.648864<br>90.0% / 551 | $1,330<br>$408,407<br>0.650425<br>85.0% / 541 | $1,400<br>$357,028<br>0.650608<br>80.0% / 538 | $1,435<br>$332,255<br>0.648965<br>75.0% / 549 | $1,505<br>$284,697<br>0.647234<br>70.0% / 564 | $1,500<br>$287,991<br>0.648042<br>71.6% / 559 |
| Portfolio 9 | $1,015<br>$726,188<br>0.623965<br>99.0% / 642 | $1,155<br>$607,995<br>0.639773<br>95.0% / 601 | $1,260<br>$521,742<br>0.646290<br>90.0% / 576 | $1,330<br>$465,737<br>0.648043<br>85.0% / 558 | $1,365<br>$438,693<br>0.647203<br>80.0% / 565 | $1,435<br>$386,805<br>0.646930<br>75.0% / 570 | $1,505<br>$337,125<br>0.645504<br>70.0% / 579 | $1,500<br>$340,610<br>0.647140<br>73.2% / 567 |
| Portfolio 10 | $980<br>$823,196<br>0.610886<br>99.0% / 646 | $1,120<br>$700,548<br>0.628826<br>95.0% / 635 | $1,260<br>$581,125<br>0.639241<br>90.0% / 604 | $1,330<br>$523,254<br>0.641153<br>85.0% / 594 | $1,400<br>$467,951<br>0.641746<br>80.0% / 589 | $1,470<br>$415,279<br>0.641176<br>75.0% / 593 | $1,540<br>$364,335<br>0.639518<br>70.0% / 603 | $1,500<br>$393,276<br>0.641177<br>74.0% / 592 |
| Portfolio 11 | $945<br>$919,478<br>0.598871<br>99.0% / 650 | $1,085<br>$792,343<br>0.619027<br>95.0% / 645 | $1,260<br>$637,721<br>0.633802<br>90.0% / 618 | $1,330<br>$578,117<br>0.635825<br>85.0% / 612 | $1,365<br>$549,197<br>0.635148<br>80.0% / 615 | $1,470<br>$466,375<br>0.636171<br>75.0% / 611 | $1,540<br>$413,359<br>0.634713<br>70.0% / 616 | $1,500<br>$443,482<br>0.636663<br>74.8% / 609 |
| Portfolio 12 | $910<br>$1,023,052<br>0.587538<br>99.0% / 651 | $1,050<br>$891,386<br>0.610050<br>95.0% / 648 | $1,225<br>$730,954<br>0.626998<br>90.0% / 639 | $1,295<br>$668,599<br>0.629755<br>85.0% / 633 | $1,365<br>$608,452<br>0.631178<br>80.0% / 628 | $1,470<br>$522,768<br>0.632421<br>75.0% / 624 | $1,540<br>$467,799<br>0.631146<br>70.0% / 629 | $1,500<br>$499,002<br>0.632997<br>74.8% / 622 |
| Portfolio 13 | $875<br>$1,124,428<br>0.576481<br>99.0% / 653 | $1,050<br>$954,536<br>0.606685<br>95.0% / 649 | $1,225<br>$789,080<br>0.623748<br>90.0% / 643 | $1,295<br>$725,003<br>0.626569<br>85.0% / 640 | $1,365<br>$663,134<br>0.628075<br>80.0% / 637 | $1,470<br>$574,676<br>0.629477<br>75.0% / 634 | $1,540<br>$517,985<br>0.628345<br>70.0% / 636 | $1,500<br>$550,123<br>0.629993<br>74.6% / 631 |

Line 1: Monthly Payment  Line 2: Terminal Value  Line 3: Utility  Line 4: Certainty/Ranking

Figure 11

PREFERENCE LANDSCAPE AT 30% ANNUITIZATION

| Certainty | 99% | 95% | 90% | 85% | 80% | 75% | 70% | Requested |
|---|---|---|---|---|---|---|---|---|
| Portfolio 1 | $945<br>$149,291<br>0.666436<br>99.0% / 438 | $1,015<br>$105,425<br>0.668240<br>95.0% / 424 | $1,050<br>$84,247<br>0.666840<br>90.0% / 431 | $1,050<br>$84,247<br>0.664605<br>85.0% / 452 | $1,085<br>$64,183<br>0.662341<br>80.0% / 468 | $1,085<br>$64,183<br>0.659849<br>75.0% / 482 | $1,120<br>$46,076<br>0.656699<br>70.0% / 495 | |
| Portfolio 2 | $980<br>$196,377<br>0.676771<br>99.0% / 332 | $1,050<br>$150,705<br>0.678132<br>95.0% / 313 | $1,085<br>$128,486<br>0.676684<br>90.0% / 334 | $1,120<br>$107,076<br>0.674515<br>85.0% / 361 | $1,155<br>$86,816<br>0.671756<br>80.0% / 388 | $1,155<br>$86,816<br>0.669264<br>75.0% / 416 | $1,190<br>$68,491<br>0.665714<br>70.0% / 444 | |
| Portfolio 3 | $1,015<br>$227,066<br>0.685403<br>99.0% / 235 | $1,085<br>$180,839<br>0.686099<br>95.0% / 228 | $1,120<br>$158,504<br>0.684372<br>90.0% / 239 | $1,155<br>$137,142<br>0.682105<br>85.0% / 261 | $1,155<br>$137,142<br>0.679745<br>80.0% / 287 | $1,190<br>$116,735<br>0.676723<br>75.0% / 333 | $1,225<br>$97,842<br>0.673147<br>70.0% / 375 | |
| Portfolio 4 | $980<br>$303,189<br>0.689228<br>99.0% / 210 | $1,050<br>$256,230<br>0.691201<br>95.0% / 201 | $1,120<br>$210,880<br>0.690772<br>90.0% / 205 | $1,155<br>$189,055<br>0.688664<br>85.0% / 214 | $1,190<br>$167,964<br>0.686062<br>80.0% / 229 | $1,225<br>$147,939<br>0.682956<br>75.0% / 250 | $1,260<br>$129,059<br>0.679350<br>70.0% / 291 | |
| Portfolio 5 | $945<br>$338,221<br>0.685697<br>99.0% / 231 | $1,050<br>$267,862<br>0.690277<br>95.0% / 207 | $1,120<br>$222,659<br>0.689893<br>90.0% / 208 | $1,155<br>$200,898<br>0.687864<br>85.0% / 219 | $1,190<br>$179,917<br>0.685345<br>80.0% / 237 | $1,225<br>$159,793<br>0.682273<br>75.0% / 258 | $1,260<br>$140,930<br>0.678681<br>70.0% / 307 | |
| Portfolio 6 | $945<br>$416,125<br>0.695190<br>99.0% / 180 | $1,050<br>$340,058<br>0.699932<br>95.0% / 143 | $1,120<br>$291,053<br>0.699681<br>90.0% / 146 | $1,190<br>$244,034<br>0.697697<br>85.0% / 162 | $1,225<br>$221,619<br>0.694875<br>80.0% / 184 | $1,260<br>$200,093<br>0.691576<br>75.0% / 198 | $1,295<br>$179,645<br>0.687829<br>70.0% / 220 | |
| Portfolio 7 | $980<br>$461,007<br>0.705636<br>99.0% / 93 | $1,050<br>$407,076<br>0.707805<br>95.0% / 74 | $1,120<br>$354,596<br>0.707682<br>90.0% / 75 | $1,190<br>$303,855<br>0.705815<br>85.0% / 89 | $1,225<br>$279,577<br>0.703083<br>80.0% / 125 | $1,295<br>$233,390<br>0.698837<br>75.0% / 153 | $1,330<br>$211,764<br>0.694884<br>70.0% / 183 | |
| Portfolio 8 | $945<br>$556,779<br>0.709235<br>99.0% / 66 | $1,050<br>$470,824<br>0.714243<br>95.0% / 37 | $1,155<br>$387,896<br>0.714658<br>90.0% / 35 | $1,190<br>$361,119<br>0.712481<br>85.0% / 48 | $1,260<br>$310,029<br>0.709174<br>80.0% / 68 | $1,295<br>$285,669<br>0.705751<br>75.0% / 91 | $1,365<br>$239,244<br>0.700410<br>70.0% / 140 | |
| Portfolio 9 | $945<br>$615,920<br>0.713220<br>99.0% / 46 | $1,050<br>$527,271<br>0.718426<br>95.0% / 14 | $1,155<br>$441,500<br>0.719046<br>90.0% / 10 | $1,190<br>$413,722<br>0.716935<br>85.0% / 26 | $1,260<br>$360,596<br>0.713800<br>80.0% / 41 | $1,295<br>$335,262<br>0.710465<br>75.0% / 58 | $1,365<br>$286,490<br>0.705351<br>70.0% / 95 | |
| Portfolio 10 | $910<br>$707,195<br>0.709196<br>99.0% / 67 | $1,015<br>$614,928<br>0.716250<br>95.0% / 30 | $1,120<br>$525,273<br>0.718382<br>90.0% / 15 | $1,190<br>$467,255<br>0.716938<br>85.0% / 25 | $1,260<br>$412,035<br>0.713967<br>80.0% / 40 | $1,330<br>$359,931<br>0.709682<br>75.0% / 64 | $1,400<br>$309,977<br>0.704279<br>70.0% / 110 | |
| Portfolio 11 | $910<br>$767,334<br>0.709851<br>99.0% / 63 | $1,015<br>$672,251<br>0.717366<br>95.0% / 22 | $1,120<br>$579,696<br>0.719733<br>90.0% / 8 | $1,190<br>$519,750<br>0.718449<br>85.0% / 13 | $1,260<br>$462,651<br>0.715652<br>80.0% / 32 | $1,330<br>$408,421<br>0.711586<br>75.0% / 51 | $1,400<br>$356,278<br>0.706379<br>70.0% / 85 | |
| Portfolio 12 | $875<br>$863,657<br>0.706494<br>99.0% / 84 | $980<br>$764,930<br>0.716192<br>95.0% / 31 | $1,120<br>$637,038<br>0.721621<br>90.0% / 3 | $1,190<br>$575,279<br>0.720551<br>85.0% / 4 | $1,260<br>$516,221<br>0.717941<br>80.0% / 17 | $1,330<br>$459,976<br>0.714039<br>75.0% / 39 | $1,400<br>$405,715<br>0.709029<br>70.0% / 69 | |
| Portfolio 13 | $840<br>$958,394<br>0.702323<br>99.0% / 131 | $980<br>$822,374<br>0.717688<br>95.0% / 19 | $1,120<br>$690,505<br>0.723510<br>90.0% / 1 | $1,190<br>$626,904<br>0.722671<br>85.0% / 2 | $1,260<br>$565,920<br>0.720342<br>80.0% / 6 | $1,330<br>$507,699<br>0.716641<br>75.0% / 28 | $1,400<br>$451,551<br>0.711881<br>70.0% / 50 | |

Line 1: Monthly Payment  Line 2: Terminal Value  Line 3: Utility  Line 4: Certainty/Ranking

Figure 12

Projected Monthly and Annual Income ❖
(Amounts are rounded to the nearest dollar)

| Year | Your projected monthly income | Your projected annual income | Year | Your projected monthly income | Your projected annual income | Year | Your projected monthly income | Your projected annual income |
|---|---|---|---|---|---|---|---|---|
| 2003 | $1,120 | $13,440 | 2012 | $1,461 | $17,536 | 2021 | $1,907 | $22,881 |
| 2004 | $1,154 | $13,843 | 2013 | $1,505 | $18,062 | 2022 | $1,964 | $23,567 |
| 2005 | $1,188 | $14,258 | 2014 | $1,550 | $18,604 | 2023 | $2,023 | $24,274 |
| 2006 | $1,224 | $14,686 | 2015 | $1,597 | $19,162 | 2024 | $2,084 | $25,002 |
| 2007 | $1,261 | $15,127 | 2016 | $1,645 | $19,737 | 2025 | $2,146 | $25,752 |
| 2008 | $1,298 | $15,581 | 2017 | $1,694 | $20,329 | 2026 | $2,210 | $26,525 |
| 2009 | $1,337 | $16,048 | 2018 | $1,745 | $20,939 | 2027 | $2,277 | $27,321 |
| 2010 | $1,377 | $16,530 | 2019 | $1,797 | $21,567 | 2028 | $2,345 | $28,140 |
| 2011 | $1,419 | $17,025 | 2020 | $1,851 | $22,214 | | | |
| | 90 | | | 91 | | | 92 | |

Figure 13

Projected Beginning and Ending Balances ❖
(Amounts are rounded to the nearest dollar)

| Year | Low-Range Scenario | | Median Scenario | | High-Range Scenario | |
|---|---|---|---|---|---|---|
| | Starting Balance | Ending Balance | Starting Balance | Ending Balance | Starting Balance | Ending Balance |
| 2003 | $350,000 | $355,312 | $350,000 | $408,969 | $350,000 | $468,283 |
| 2004 | $355,312 | $286,420 | $408,969 | $394,025 | $468,283 | $530,582 |
| 2005 | $286,420 | $270,884 | $394,025 | $367,403 | $530,582 | $584,823 |
| 2006 | $270,884 | $288,358 | $367,403 | $408,047 | $584,823 | $644,724 |
| 2007 | $288,358 | $252,156 | $408,047 | $540,390 | $644,724 | $632,882 |
| 2008 | $210,568 | $188,064 | $454,138 | $464,410 | $534,226 | $503,890 |
| 2009 | $188,064 | $181,746 | $464,410 | $433,201 | $503,890 | $559,450 |
| 2010 | $181,746 | $169,857 | $433,201 | $406,040 | $559,450 | $623,532 |
| 2011 | $169,857 | $135,666 | $406,040 | $469,769 | $623,532 | $717,793 |
| 2012 | $135,666 | $105,478 | $469,769 | $503,678 | $717,793 | $787,610 |
| 2013 | $105,478 | $101,432 | $503,678 | $531,264 | $787,610 | $893,558 |
| 2014 | $101,432 | $97,205 | $531,264 | $509,867 | $893,558 | $917,516 |
| 2015 | $97,205 | $86,159 | $509,867 | $589,325 | $917,516 | $1,004,020 |
| 2016 | $86,159 | $69,324 | $589,325 | $504,990 | $1,004,020 | $989,484 |
| 2017 | $69,324 | $53,623 | $504,990 | $432,605 | $989,484 | $1,078,444 |
| 2018 | $53,623 | $40,568 | $432,605 | $523,190 | $1,078,444 | $1,121,909 |
| 2019 | $40,568 | $25,239 | $523,190 | $559,351 | $1,121,909 | $1,192,681 |
| 2020 | $25,239 | $6,610 | $559,351 | $529,166 | $1,192,681 | $1,240,563 |
| 2021 | $6,610 | $0 | $529,166 | $576,874 | $1,240,563 | $1,178,018 |
| 2022 | $0 | $0 | $576,874 | $654,969 | $1,178,018 | $1,461,164 |
| 2023 | $0 | $0 | $654,969 | $613,113 | $1,461,164 | $1,569,926 |
| 2024 | $0 | $0 | $613,113 | $671,191 | $1,569,926 | $1,767,593 |
| 2025 | $0 | $0 | $671,191 | $712,664 | $1,767,593 | $1,957,453 |
| 2026 | $0 | $0 | $712,664 | $574,891 | $1,957,453 | $2,001,100 |
| 2027 | $0 | $0 | $574,891 | $537,902 | $2,001,100 | $2,231,558 |
| 2028 | $0 | $0 | $537,902 | $545,958 | $2,231,558 | $2,476,683 |
| | 93 | 94 | 95 | 96 | 97 | 98 | 99 |

Figure 14

Changing Asset Allocations

| | Mutual Funds | | | Variable Annuities | | |
|---|---|---|---|---|---|---|
| Year | Stocks | Bonds | Short-Term Securities | Stocks | Bonds | Short-Term Securities |
| 2003 | 100% | 0% | 0% | 95% | 3% | 2% |
| 2008 | 94% | 6% | 0% | 94% | 4% | 2% |
| 2013 | 86% | 14% | 0% | 88% | 5% | 7% |
| 2018 | 80% | 20% | 0% | 81% | 6% | 13% |
| 2023 | 74% | 23% | 3% | 75% | 6% | 19% |

| | Recommended Strategy | Alternate Strategy B | Alternate Strategy C | Strategy for Your Desired Monthly Income |
|---|---|---|---|---|
| Initial Monthly Income | $1,120 | $1,190 | $1,120 | $1,500 |
| Simulation Success Rate | 90% | 85% | 90% | 74% |
| Product Mix | Mutual Funds 70%<br>Variable Annuities 30% | Mutual Funds 70%<br>Variable Annuities 30% | Mutual Funds 70%<br>Variable Annuities 30% | Mutual Funds 100%<br>Variable Annuities 0% |
| Asset Allocation for Mutual Funds | Stocks 100%<br>Bonds 0%<br>Short-Term Securities 0% | Stocks 100%<br>Bonds 0%<br>Short-Term Securities 0% | Stocks 94%<br>Bonds 6%<br>Short-Term Securities 0% | Stocks 94%<br>Bonds 6%<br>Short-Term Securities 0% |
| Asset Allocation for Variable Annuities | Stocks 95%<br>Bonds 3%<br>Short-Term Securities 2% | Stocks 95%<br>Bonds 3%<br>Short-Term Securities 2% | Stocks 94%<br>Bonds 4%<br>Short-Term Securities 2% | Not Applicable |

Figure 16

Investment Allocations with T. Rowe Price Mutual Funds

| | Your Recommended Income Strategy | | Alternate Strategy B | | Alternate Strategy C | |
|---|---|---|---|---|---|---|
| Stocks | | | | | | |
| Equity Income Fund | 31% | $75,950 | 31% | $75,950 | 29% | $71,050 |
| Blue Chip Growth Fund | 31% | $75,950 | 31% | $75,950 | 29% | $71,050 |
| Small-Cap Stock Fund | 20% | $49,000 | 20% | $49,000 | 19% | $46,550 |
| International Stock Fund | 18% | $44,100 | 18% | $44,100 | 17% | $41,650 |
| | 100% | $245,000 | 100% | $245,000 | 94% | $230,300 |
| Bonds | | | | | | |
| New Income Fund | 0% | $0 | 0% | $0 | 4% | $9,800 |
| High Yield Fund | 0% | $0 | 0% | $0 | 2% | $4,900 |
| International Bond Fund | 0% | $0 | 0% | $0 | 0% | $0 |
| Short-Term Securities | | | | | | |
| Short Term U.S. Government Fund | 0% | $0 | 0% | $0 | 0% | $14,700 |
| | 0% | $0 | 0% | $0 | 0% | $0 |
| | 0% | $0 | 0% | $0 | 0% | $0 |
| Total | 100% | $245,000 | 100% | $245,000 | 100% | $245,000 |

Investment Allocations with T. Rowe Price Variable Annuities

| | Your Recommended Income Strategy | | Alternate Strategy B | | Alternate Strategy C | |
|---|---|---|---|---|---|---|
| Equity Income Portfolio | 48% | $50,400 | 48% | $50,400 | 44% | $46,200 |
| Mid-Cap Growth Portfolio | 19% | $19,950 | 19% | $19,950 | 19% | $19,950 |
| New America Growth Portfolio | 5% | $5,250 | 5% | $5,250 | 4% | $4,200 |
| International Stock Portfolio | 18% | $18,900 | 18% | $18,900 | 16% | $16,800 |
| Personal Strategy Balanced Portfolio | 10% | $10,500 | 10% | $10,500 | 15% | $15,750 |
| Limited-Term Bond Portfolio | 0% | $0 | 0% | $0 | 2% | $2,100 |
| Total | 100% | $105,000 | 100% | $105,000 | 100% | $105,000 |

Figure 17

SYSTEM FOR FINANCIAL PLANNING

BACKGROUND OF THE INVENTION

1. Field of the Invention

The invention relates to a system for financial planning for an investor and, more particularly, to a system for selection of at least one financial strategy for an investor.

2. Background of the Invention

Traditionally, an investor has a portfolio of investments and may seek out the advice of a financial counselor to recommend a financial strategy for achieving the financial goals of the investor. The investor is interviewed and conveys the financial goals to the financial counselor. Using the financial goals of the investor, the financial counselor thoughtfully considers various financial strategies to achieve the financial goals of the investor. The ability of the financial counselor to offer such advice to the investor comes from years of training and experience in financial planning. Using the acquired knowledge and experience, the financial counselor recommends at least one financial strategy to the investor. With this financial advice, the investor chooses a financial strategy to achieve the financial goals of the investor and pursues an implementation plan by investing in a portfolio according to the chosen financial strategy. As investors know, the results of such financial advice are not guaranteed, because no financial counselor can predict the future.

To proffer such financial advice to an investor requires a significant amount of time on the part of the financial counselor and a significant amount of money on the part of the investor. Alternatively, an investor may elect to research and determine an appropriate strategy without the use of a financial counselor.

There exists a need to automate the process of analyzing the assets of the investor, considering the financial goals of the investor, and recommending at least one financial strategy to the investor. Further, there exists a need for the investor to have the ability to obtain such a recommendation without the intervention of a financial counselor. Moreover, there exists a need to reduce the cost to the investor of obtaining such advice.

SUMMARY OF THE INVENTION

An object of the invention is to select at least one financial strategy for an investor to meet the financial goals of the investor.

An object of the invention is to reduce the amount of time required by a financial counselor to provide financial advice to an investor.

An object of the invention is to automate the process of providing financial advice to an investor.

An object of the invention is to reduce the cost to an investor of obtaining financial advice concerning the assets of the investor for use with a financial strategy.

The invention includes a method, an apparatus, a system, and articles of manufacture for selecting at least one financial strategy for an investor.

The method of the invention includes a method for determining a financial strategy for assets to meet financial goals. The method comprises the steps of determining an outcome for each of a number of financial strategies, and selecting at least one of the financial strategies to meet the financial goals using a software-implemented decision analysis and the outcomes for the financial strategies. The outcome for each of the financial strategies can be determined, for example, by using Monte Carlo simulations, and the software-implemented decision analysis can employ, for example, multi-attribute utility theory.

The apparatus of the invention includes a computer having a computer-readable medium embodying software to operate the computer in accordance with the invention.

The system of the invention includes a computer system having a computer-readable medium embodying software to operate a computer in accordance with the invention.

The articles of manufacture of the invention include a computer-readable medium embodying software to operate a computer in accordance with the invention, an information storage device embodying a questionnaire for an investor, and an information storage device embodying a report for an investor.

The above objects and advantages of the invention are illustrative, and not exhaustive, of those which can be achieved by the invention. Thus, these and other objects and advantages of the invention will be apparent from the description herein or can be learned from practicing the invention, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 8 illustrates a questionnaire for achieving retirement financial goals.

FIG. 10 illustrates the measures and utility score calculated from a number of Monte Carlo simulations for a single financial strategy.

FIGS. 11 and 12 illustrate the results from determining utility scores for a number of financial strategies.

FIG. 13 illustrates a graph of total assets over time from numerous Monte Carlo simulations for a selected financial strategy.

FIG. 14 illustrates a table of projected beginning and final balances for a selected financial strategy.

FIG. 15 illustrates a table describing the portfolio migration for a selected financial strategy.

FIG. 16 illustrates a table comparing the selected financial strategies.

FIG. 17 illustrates a table for implementing the selected financial strategies.

DETAILED DESCRIPTION OF THE INVENTION

Figure 1:
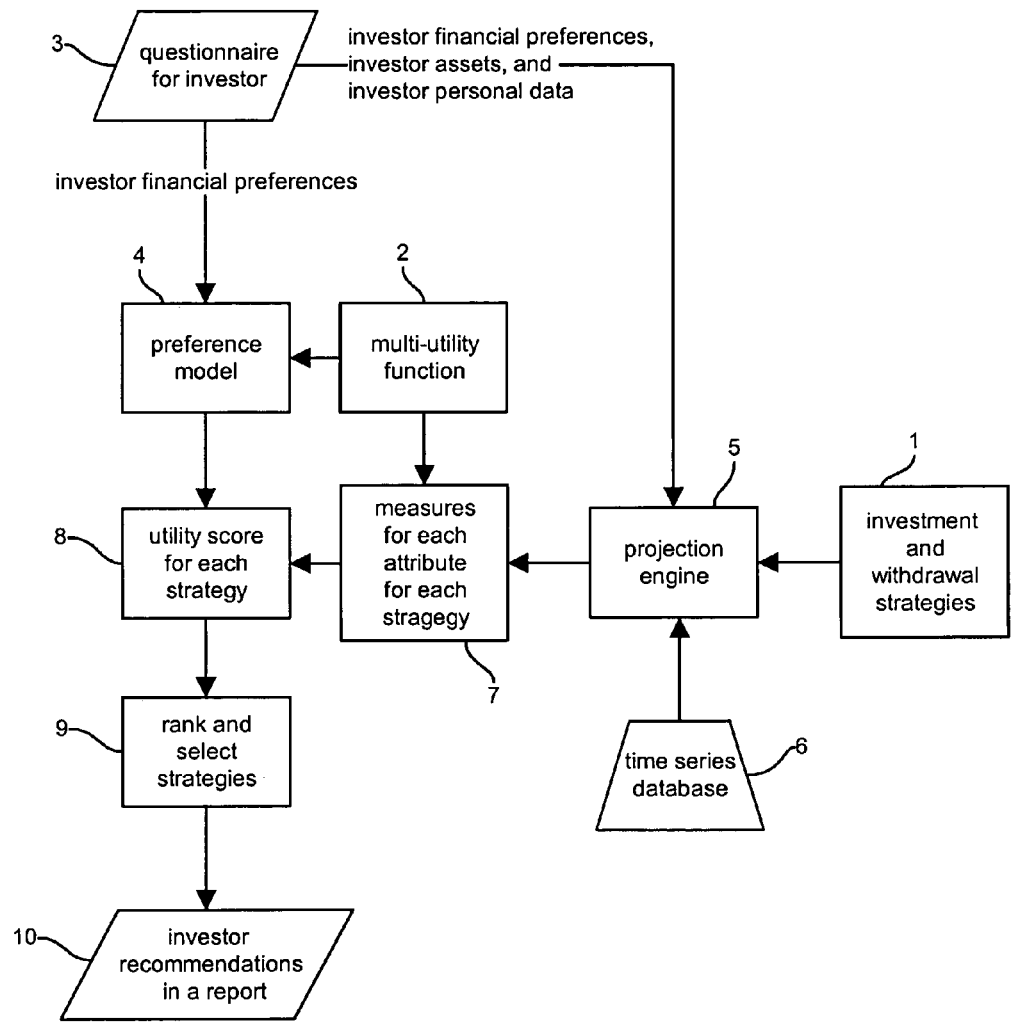
FIG. 1 illustrates a system perspective of the invention.

The description of the invention is segmented into sections on definitions, financial strategies, financial goals, investor input, the preference model, the projection engine, attribute measures, utility scores, strategy selection, investor recommendations, and the operation of the invention.

DEFINITIONS

In describing the invention, the following definitions are applicable throughout:

An "investor" refers to any natural or legal entity capable of having at least one financial goal, such as one person, two or more persons, a trust, or a corporation.

A "financial goal" refers to one or more financial aspirations involving at least one of an investment of assets, an accumulation of assets, and a withdrawal of assets. A financial goal can be for any purpose, such as for retirement, early retirement, college tuition, charitable foundations, trusts, estate planning, or a house purchase.

A "financial period" refers to the duration of one or more financial goals. For example, the financial period of a retirement financial goal usually begins at or around the time of retirement of an investor and continues until the death of the investor, which is based upon an estimated life span determined from mortality tables. The financial period of a college tuition financial goal is the number of years needed to acquire the desired degree, such as two, four, or five years. The financial period of a house purchase financial plan is the length of the mortgage for the house purchase.

A "financial strategy" refers to at least one of an investment strategy, an accumulation strategy, and a withdrawal strategy.

A "financial counselor" refers to one or more persons having skill and knowledge in a type of financial planning. Typically, a financial counselor has one or more degrees, years of experience in a type of financial planning, is licensed by a regulatory body, and may be certified by a regulatory body or association. A financial counselor may be, for example, a Registered Investment Advisor Representative.

A "financial planner" refers to one or more persons having skill and knowledge in finance. A financial planner can be, for example, a financial counselor, a Registered Investment Advisor, a Certified Financial Planner, a stockbroker, or a portfolio manager.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a personal computer (PC); a server; an interactive television; and a hybrid combination of a computer and an interactive television. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM; a magnetic tape; and a memory chip.

"Software" refers to prescribed rules to operate a computer. Examples of software include: software; code segments; instructions; computer programs; and programmed logic.

A "network" refers to a number of computers and associated devices that are connected by communication facilities. A network involves permanent connections such as cables or temporary connections such as those made through telephone or other communication links. Examples of a network include: the Internet; a local area network (LAN); and a wide area network (WAN).

An "information storage device" refers to an article of manufacture used to store information. An information storage device can have different forms, for example, paper form and electronic form. In paper form, the information storage device comprises paper printed with the information. In electronic form, the information storage device comprises a computer-readable medium storing the information as software.

Financial Strategies

FIG. 1 illustrates a system perspective of the invention. In block 1, a number of financial strategies are determined and are stored on a computer-readable medium. The invention matches the assets and financial goals of the investor with at least one financial strategy.

Figure 2:
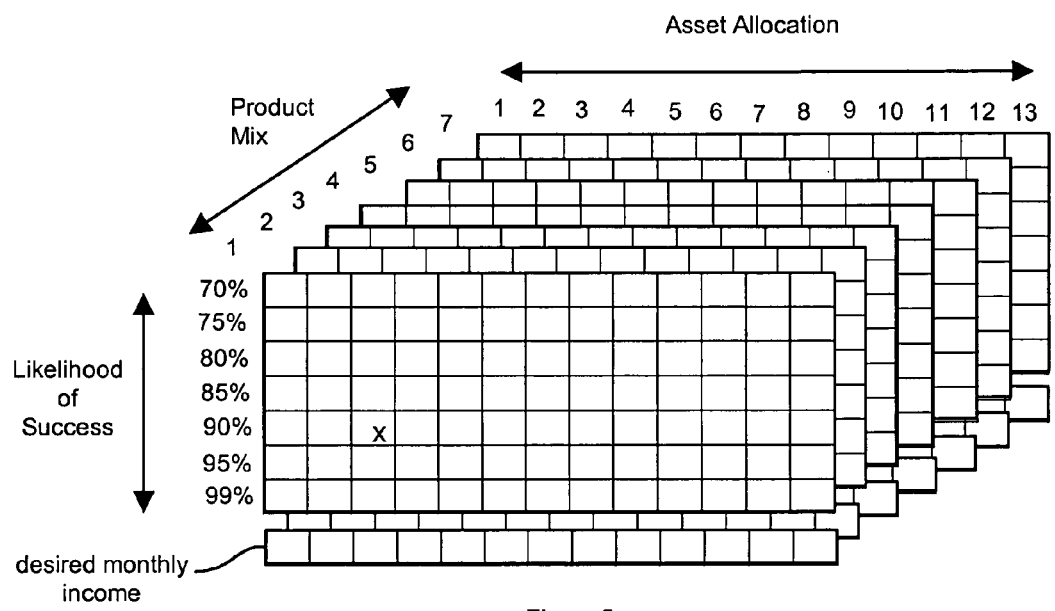
FIG. 2 illustrates a multi-dimensional matrix of financial variables.

The financial strategies are determined from a multi-dimensional matrix of financial variables, such as the matrix illustrated in FIG. 2. The multi-dimensional matrix has a number of variables, such as an asset allocation, a product mix, and a likelihood of success of achieving a withdrawal rate. Each dimension of the multi-dimensional matrix has a number of values. By combining the financial variables in every possible combination, a multi-dimensional matrix, such as the one illustrated in FIG. 2, results.

Each of the financial strategies has a duration equal to the financial period of the financial goals of the investor and may have features to increase the realism of the financial strategy, as discussed below.

Figure 3:
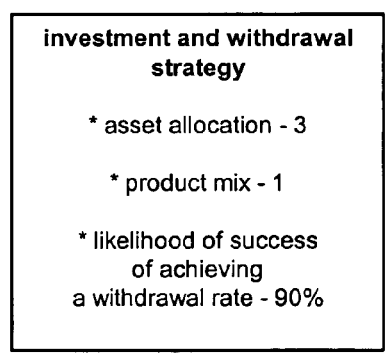
FIG. 3 illustrates a cell in the multi-dimensional matrix of FIG. 2.

Each cell in the multi-dimensional matrix corresponds to a unique combination of the financial variables. FIG. 3 illustrates a cell of the multi-dimensional matrix of FIG. 2. In FIG. 3, the financial strategy for the cell illustrated has the third asset allocation, the first product mix, and a likelihood of success of achieving a withdrawal rate of 90%. The cell of FIG. 3 corresponds to the cell marked with the "X" in FIG. 2.

Each of the three financial variables illustrated in the multi-dimensional matrix of FIG. 2 is discussed next. An asset allocation is a mix of various asset classes and sub-asset classes. Asset classes include stocks, bonds, and short-term securities. The sub-asset class for stocks includes large-cap stocks, small-cap stocks, and international stocks. The sub-asset class for bonds includes investment grade bonds, high-yield bonds, and international bonds. The sub-asset class for short-term securities is made up of short-term securities including money market securities and short-term investment-grade bonds. An example of an asset allocation is 86% stocks, 14% bonds, and 0% short-term securities. In FIG. 2, the asset allocation financial variable has 13 values.

For the asset class of stocks, the sub-asset class of large-cap stock provides for long-term capital appreciation opportunities and dividend income and includes stocks of well-established companies with market capitalization of $1 billion or more. The sub-asset class of small-cap stocks provides long-term capital appreciation and includes stocks of small domestic companies with market capitalization of less than $1 billion. The sub-asset class of international stocks provides long-term capital appreciation and diversification and includes stocks of companies outside the United States.

For the asset class of bonds, the sub-asset class of investment grade bonds provides diversification and income to temper overall risk and includes domestic bonds with other debt securities with credit ratings of investment grade or better. The sub-asset class of high-yield bonds provides diversification, income, and some capital appreciation and includes below-investment grade debt securities (i.e., "junk"

bonds). The sub-asset class of international bonds provides diversification, income, and capital appreciation, and includes bonds issued outside the United States.

For the asset class of short-term securities, the single sub-asset class of short-term securities provides the highest level of current income consistent with minimal fluctuation of principal and includes lower-volatility investments, such as cash, money market securities or short-term investment-grade bonds having, for example, maturities of less than three years.

Other asset classes can be used, such as a futures asset class and a blended asset class. Other sub-asset classes can be used, such as mid-cap stocks for the stock asset class, domestic tax-free bonds for the bond asset class, and taxable and tax-free money-market securities for the short-term securities asset class.

The financial variable of a product mix is a mix of investment products. For example, the product mix can be a mix of at least one mutual fund and at least one variable annuity. The product mix for a range of combinations of mutual funds and variable annuities can be, for example, from 100% mutual funds and 0% variable annuities to 40% mutual funds and 60% variable annuities in steps of 10%. This exemplary product mix produces up to 7 different combinations of mutual funds and variable annuities and is used in FIG. 2 as the product mix financial variable. The asset allocations for mutual funds and variable annuities for a given product mix have the same risk/return profile, although the actual percentage of investment in each sub-asset class may not be identical.

With the financial variable of a product mix, flexibility is added to the financial strategies. Because mutual funds and variable annuities possess different characteristics in terms of liquidity, uncertainty, terminal value, and so forth, the product mix financial variable provides diversification in the financial strategies to meet the financial goals of the investor.

For the product mix, the variable annuities are distinguishable from the mutual funds in that variable annuities are insurance instruments with pre-determined payout guarantees. The payments of the variable annuity fluctuate periodically with the market performance of the underlying funds. However, payments are guaranteed to be paid for a specified duration, such as the life of an investor or the period of retirement.

A variable annuity can be either immediate or deferred. For an immediate variable annuity, payments to the investor begin within a specified time period after execution of the contract. For a deferred variable annuity, payments are deferred until a future date. Many payout options are available for a variable annuity.

For the product mix financial variable, instead of or in addition to using mutual funds and variable annuities, a variety of other financial instruments can be used. Examples of other financial instruments include individual stocks and bonds, options, government obligations, commodities, fixed annuities, and stable value investments.

The assets of the investor are invested according to the asset allocation and product mix using one or more account types, such as traditional IRA, rollover IRA, Roth IRA, SIMPLE IRA, SEP-IRA, 401(k), 403(b), Keogh, money purchase plan, profit sharing plan, taxable assets, taxable assets in revocable living trust, and existing deferred annuities.

The financial variable of a likelihood of success of achieving a withdrawal rate is the probability that an investor is able to withdraw a specified dollar amount on a periodic basis for the financial period of a financial goal of the investor without prematurely exhausting the assets of the investor. For the example of a retirement financial goal, this likelihood of success corresponds to the probability that the investor can withdraw a certain amount of money each month from the assets of the investor throughout the retirement of the investor without prematurely exhausting the assets of the investor. For the example of a college payment financial goal, this likelihood of success corresponds to the probability that the investor can withdraw a certain amount semi-annually to make college tuition payments throughout the years of a student's enrollment without prematurely exhausting the assets of the investor to pay the college tuition.

In the multi-dimensional matrix of FIG. 2, the likelihood of success financial variable has seven values, namely 99% to 70% generally in 5% steps. Although the likelihood of success for achieving a withdrawal rate is predetermined, the withdrawal rate corresponding to the likelihood of success is determined using Monte Carlo simulations, which are discussed below. In particular, the withdrawal rate for a 99% likelihood of success corresponds to a withdrawal rate that is sustainable in 99% of the Monte Carlo simulations, the withdrawal rate for a 95% likelihood of success corresponds to a withdrawal rate that is sustainable in 95% of the Monte Carlo simulations, and so forth.

A permutation of the likelihood of success financial variable is included as an eighth value and is illustrated in the multi-dimensional matrix of FIG. 2 as the desired monthly income for the likelihood of success variable. Instead of the likelihood of success of achieving a withdrawal rate, the desired monthly income of the investor is used. A desired monthly income for the investor is selected, and the Monte Carlo simulations determine the likelihood of success of achieving the desired monthly income. For example, if the desired monthly income for the investor is $2,500 per month, the percentage of Monte Carlo simulations that result in a minimum monthly income of $2,500 or greater is the likelihood of success of achieving the desired monthly income for the investor. As an option, one or more desired monthly incomes for the investor is selected. As discussed further below, the investor is queried as to the desired monthly income.

For the three financial variables illustrated for the multi-dimensional matrix in FIG. 2, a total of up to 728 unique financial strategies are determined, and each cell in the matrix corresponds to one of the financial strategies. In certain cases, the responses from the investor in the questionnaire will reduce the number of financial strategies. For example, if the assets of the investor are unable to support one or more of the product mixes, the number of financial strategies are reduced accordingly.

Although the multi-dimensional matrix is discussed using three financial variables, one or more financial variables can be used. For example, one, two, three, four, or more financial variables can be used to construct the multi-dimensional matrix of financial variables. A multi-dimensional matrix having one, two, or three financial variables can be illustrated, such as in FIG. 2, but a multi-dimensional matrix having four or more financial variables can be difficult to illustrate. The choice of the number of financial variables to use depends on the desired variety and complexity of the financial strategies.

Although the three financial variables of asset allocation, product mix, and likelihood of success are used to construct the multi-dimensional matrix, other financial variables can be used. The choice of which financial variables to use depends on the desired variety and complexity of the financial strategies. As those skilled in the art will recognize, any aspect of a financial strategy can be used as a financial variable. Some of the possible financial variables are discussed next.

One possible financial variable which can be used with the multi-dimensional matrix is the likelihood of success of requiring a certain amount of initial assets of the investor. Instead of the likelihood of success of achieving a withdrawal rate as the financial variable, the likelihood of success of requiring a certain amount of initial assets is used as the financial variable. The investor specifies a desired monthly income, and the Monte Carlo simulations determine the likelihood of success of requiring a certain amount of initial assets to achieve the desired monthly income. In particular, the initial assets for a 99% likelihood of success corresponds to the initial assets needed to sustain the desired monthly income in 99% of the Monte Carlo simulations, the initial assets for a 95% likelihood of success corresponds to the initial assets needed to sustain the desired monthly income in 95% of the Monte Carlo simulations, and so forth.

As another possible financial variable, a second asset allocation financial variable can be added to the multi-dimensional matrix. Instead of having the mutual funds and the variable annuities in the product mix having the same asset allocation as determined by the asset allocation financial variable, the first asset allocation financial variable determines the asset allocation for the mutual funds, and the second allocation financial variable determines the asset allocation for the variable annuities. The percentage of mutual funds and variable annuities for the assets are predetermined or are determined by the product mix financial variable.

Another possible financial variable that can be used with the multi-dimensional matrix is a variable annuity payout option financial variable. The type of payout option is one of the factors which dictates the income stream that an annuity generates and can be divided into two broad categories: life options and non-life options. Life options are based upon the life expectancy of an annuitant and provide an income that cannot be outlived. Life income with liquidity and period certain payout option can be used as the life option. Other examples of life options include pure life income, life income with period certain guaranteed payments, and life income with installment or unit refund option. Non-life options are not based upon the life expectancy of the annuitant and provide choice in the amount or duration of the payout. Examples of non-life options include fixed period option and fixed payout option.

Another possible financial variable is the financial period. By varying the financial period, the effects on achieving the financial goals by having different financial periods are determined. For the example of a retirement financial goal, the financial period is varied based on a specified retirement date and a specified life expectancy. For the example of a college payment financial goal, the financial period is varied based on the number of years until college commences or possible number of years to complete the education, for example, 4, 4.5, 5, or more years.

To increase the realism of the financial strategies, various features can be added to one or more of the financial strategies. These features include: inflation adjustment; minimum required distributions (MRDs); an ordered withdrawal strategy based on tax characteristics of the assets of the investor; an ordered annuity purchase strategy based on tax characteristics of the assets of the investor; periodic tax adjustments; periodic shifting of asset allocations; periodic rebalancing of assets to align with a current asset allocation; reinvestment of excess annuity payments; reinvestment of excess capitalized MRDs; periodic or lump-sum investor contributions; periodic withdrawal; asset management fees; staggered investor account starts; and MRD mortality rules.

For the feature of a periodic withdrawal, a financial strategy includes a periodic withdrawal by the investor from the assets of the investor. For example, a periodic withdrawal can be monthly, semi-annually, or annually. The periodic withdrawal feature can include keeping the withdrawal constant in terms of present value dollars and adjusting the withdrawal annually for inflation. Alternatively, the amount of the periodic withdrawal can fluctuate, such as increasing, decreasing, or a combination of increasing and decreasing, over the financial period of the financial strategy. For the example of a retirement financial goal, a periodic withdrawal can be used for paying long-term health care of the investor or another individual. For the example of a tuition payment financial goal, the amount of the periodic withdrawal can be increased annually not only for inflation but also for predicted tuition increases.

For the feature of inflation adjustment, a financial strategy is adjusted on a periodic basis, such as annually, for inflation.

For the feature of an MRD, a financial strategy includes annual minimum distributions from traditional IRAs, 403(b) plans, and other qualified retirement plans (e.g., profit sharing, money purchase, 401(k), and Keogh) once the account owner reaches age 70½. In certain circumstances, an employer-sponsored retirement plan permits the participant to defer taking MRDs until after he or she retires (even if past 70½). The amount of the required distribution is dependent upon certain irrevocable selections made by the account owner prior to the commencement of distributions. These selections include the life expectancy method used (i.e., single or joint), the calculation method used (i.e., fixed term, recalculation, hybrid), and the choice of designated beneficiary. As an option, a financial strategy can vary each of these selections with each other to calculate the various MRD amounts that are possible. As an option, MRDs can be calculated for all accounts, a subset of all accounts, or no accounts of the investor. As an option, the investor can be queried as to which accounts should have MRDs considered and as to what selections should be made.

For the feature of an ordered withdrawal strategy based on tax characteristics of the assets, a financial strategy has a periodic withdrawal from the assets based on a predetermined logic. For example, for a financial strategy that does not have variable annuities, withdrawals from the assets are taken from various asset classes in the following order: (1) taxable accounts; (2) revocable trust accounts; (3) traditional individual retirement accounts (IRAs); (4) non-IRA qualified accounts, e.g., Keogh and profit-sharing plans; and (5) Roth IRAs. As another example, if the investor includes two persons, such as a husband and a wife, an older-younger logic for the tax-deferred logic can be included in the ordered withdrawal logic. In this scenario, the draw-down order is: (1) taxable accounts; (2a) older client's revocable trust accounts; 2(b) younger client's revocable trust accounts; 3(a) older client's traditional IRAs; 3(b) younger client's traditional IRAs; (4a) older client's non-IRA qualified accounts; (4b) younger client's non-IRA qualified accounts; (5a) older client's Roth IRAs; and (5b) younger client's Roth IRAs. When MRD payments are applicable during the financial period, they serve as the first source to fund the periodic withdrawal, prior to the draw-down order, such as those described above. If the strategy includes an annuity in the product mix, the draw-down order is the same as the previous examples, except that the first source of income is the monthly variable annuity payment. Additionally, pro-rata distribution can be used. As an option, the investor can be queried as to the order in which accounts should be drawn down.

For the feature of an ordered annuity purchase strategy based on tax characteristics of the assets, a financial strategy provides limitations and an order of how annuities are purchased. For example, a limitation can exist that only a certain maximum percentage of an existing investor account can be used for an annuity purchase. Additionally, certain investor assets can be excluded from an annuity purchase completely because of the inherent benefits they provide, such as Roth IRAs, revocable trust accounts, or accounts to which future contributions will be made. A possible hierarchy that can be used to purchase annuities from investor assets is: (1a) older client's existing deferred annuities that were purchased previously; (1b) younger client's existing deferred annuities that were purchased previously; (2) taxable accounts; (3a) older client's traditional IRAs; and (3b) younger client's traditional IRAs.

For the feature of periodic tax adjustment, taxes for a financial strategy are calculated on a periodic basis, such as monthly. The calculated tax effect for a taxable account includes deducting taxes on appreciation and adding a tax credit for depreciation. The calculated tax effect can also include determining taxes on excess MRDs and/or annuity payments made prior to the investment of the distribution in a taxable account. As part of determining the tax implications, the tax basis can be captured and tracked for accounts, and the resulting tax burden can be calculated and reported to the investor.

For the feature of periodic shifting of the asset allocation, a financial strategy shifts the assets of the investor from a current asset allocation to a different asset allocation, such as a more conservative asset allocation, during the financial period. This is known as portfolio migration. The shifting can occur one or more times over the financial period. Portfolio migration can be used for both the assets invested in mutual funds and for the assets invested in variable annuities. As an option, if deferred annuities are included in the product mix, there could be product migration as well. To migrate the product mix, the percentage of mutual funds and the percentage of non-annuitized annuities are shifted during the financial period.

For the feature of periodic rebalancing of assets to align with a current asset allocation, the asset allocation for an investor is typically shifted after a period of time due to gains and losses for the various assets. With this feature, the current asset allocation is rebalanced on a periodic basis, such as annually, to place the asset allocation in line with a desired asset allocation based on the financial strategy.

For the feature of reinvestment of excess annuity payments, a financial strategy reinvests excess annuity payments based on the tax status of the annuitized assets. In order to maximize the amount of excess annuity payments reinvested into a taxable account, the annuity payments that result in the most taxes due should be drawn from first. A possible annuity account draw-down order which implements such a strategy is: (1a) older client's traditional IRAs; (1b) younger client's traditional IRAs; (2) taxable accounts; (3a) older client's Roth IRAs; and (3b) younger client's Roth IRAs.

For the feature of reinvestment of excess capitalized MRDs, a financial strategy reinvests excess MRD payments into a taxable account after any taxes have been paid.

For the feature of investor contributions, a financial strategy includes periodic or lump sum contributions to the asset allocation by the investor or another source.

For the feature of asset management fees, a financial strategy includes adjusting for management fees associated with the product mix. For example, the management fees deducted include management fees for mutual funds and mortality and expense charges for variable annuities.

For the feature of staggered investor account starts, a financial strategy permits the inclusion of assets at a later time than the start of the financial period. For the example of a retirement financial goal, an investor can add new assets to help meet the financial goal after the start of the retirement period.

For the feature of MRD mortality rules, a financial strategy provides for the continuation of the required distributions after the death of the account owner or the designated beneficiary. Various options are available dependant upon the life expectancy method selected, the calculation method selected, and whether the designated beneficiary is the spouse of the account owner.

Additional features for financial strategies include having contribution limits enforced for each type of investor account's assets. For example, contributions to traditional IRAs are only permitted if the account owner is younger than 70½ and his or her earned income is at least as much as the amount contributed.

As an option for all of the above features described for a financial strategy, the investor is queried as to various parameters for each of the features. For example, the investor can provide input on the order in which accounts should be drawn down, the tax rates used, specific accounts with which to purchase annuities, the inflation rate used, and specific periods of time when non-periodic withdrawals are made from the assets.

For the financial strategies, a financial planner determines the financial variables, the values for the financial variables, and the features to be included with the financial strategies. For example, for the asset allocation financial variable, a financial planner determines that asset allocation is one of the financial variables and determines the asset classes and sub-asset classes to be used for the values of the asset allocation financial variable.

Financial Goals

To determine which financial strategy is the most appropriate for an investor, the financial goals of the investor must be determined and applied to the financial strategies. The invention utilizes a software-implemented decision analysis to select at least one of the financial strategies to meet the financial goals of an investor.

Decision analysis is a mathematical approach to making a decision and provides an effective technique for organizing a complex problem into a structure that can be impartially analyzed. Decision analysis identifies important sources of uncertainty in a decision to be made and represents this uncertainty in a useful way. As an information source, decision analysis provides insight about a situation, uncertainty, objective, and trade-offs and yields a recommended course of action to solve a problem.

Preferably, the invention uses a branch of decision analysis known as multi-attribute utility theory. Utility theory is founded on the concept that a person (i.e., a decision maker) makes a decision based on the relative usefulness (i.e., utility) of various choices, or alternatives. Utility theory attempts to quantify this usefulness as a combination of the objective characteristics (i.e., attributes) of each alternative and the subjective preferences of the decision maker. When the various alternatives under consideration by the decision maker have multiple objective characteristics (i.e., attributes), the decision analysis is known as multi-attribute utility theory ("MAUT"). These various attributes describe the facts about the alternatives and show the extent to which an attribute either supports or defeats the goals of the decision maker.

MAUT focuses on problems in which a set of alternatives must be compared on the basis of multiple, and often conflicting, objectives. Essentially, MAUT creates a mathematical model of the preferences of a decision maker, including the identification of desirable objectives and the trade-offs between conflicting objectives. Objectives and alternatives are measured in terms of their attributes, which have quantitative or qualitative indices. Given the preferences of the decision maker, the value of a possibility to solve the problem posed by the decision maker is expressed mathematically as a utility. A further discussion of MAUT can be found in the following, which is incorporated herein by reference: Ralph L. Keeney and Howard Raiffa, "Decisions with Multiple Objectives," Cambridge University Press, Cambridge, United Kingdom, 1993.

In block 2 of FIG. 1, a multi-utility function (MUF) is determined using a goals hierarchy and MAUT. In block 4, a preference model is created using the MUF from block 2 and a combination of investor financial preferences from block 3 and input from a financial planner.

Figure 4:
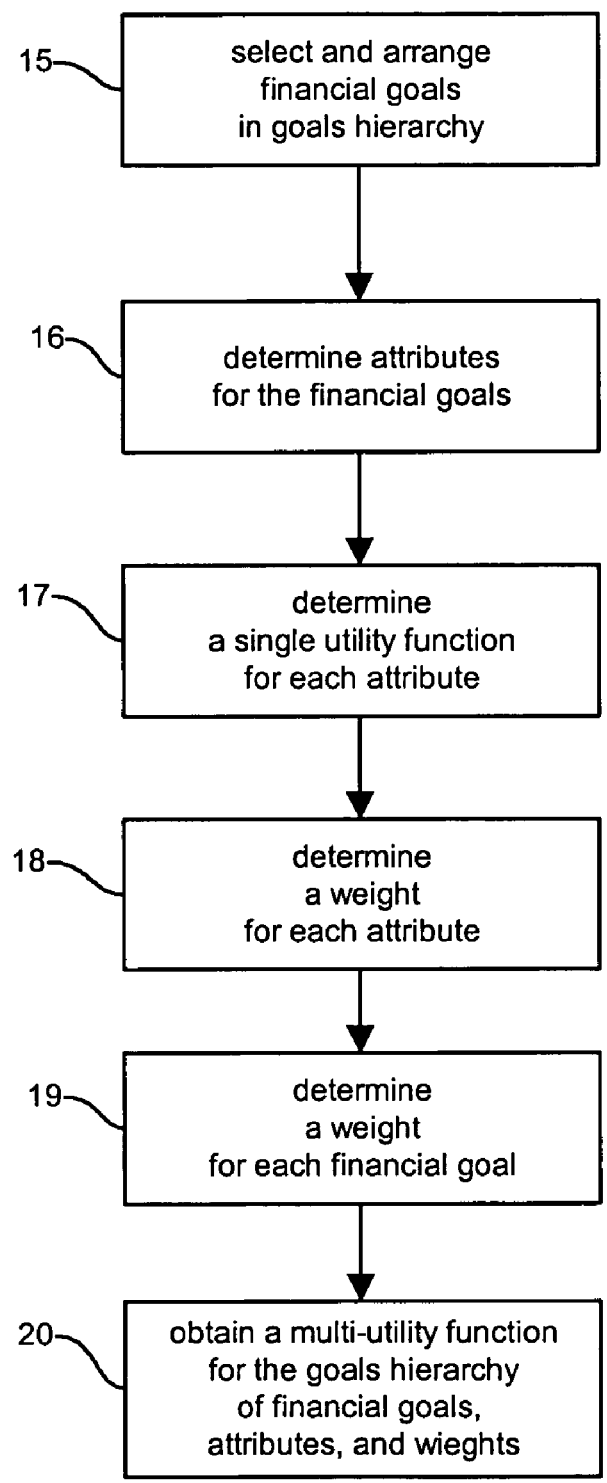
FIG. 4 illustrates a flow diagram for determining a goals hierarchy of financial goals and obtaining a multi-utility function for the goals hierarchy.

FIG. 4 illustrates a flow diagram for determining a goals hierarchy of financial goals and obtaining a MUF for the goals hierarchy. In block 15, the financial goals are selected and arranged in a goals hierarchy. The goals hierarchy of financial goals must capture a set of financial goals that realistically describe the motivations or concerns of the investor and allow meaningful distinctions to be drawn between the financial strategies. The number of financial goals and the number of layers of financial goals in the goals hierarchy depends on the financial problem to be solved.

Figure 5:
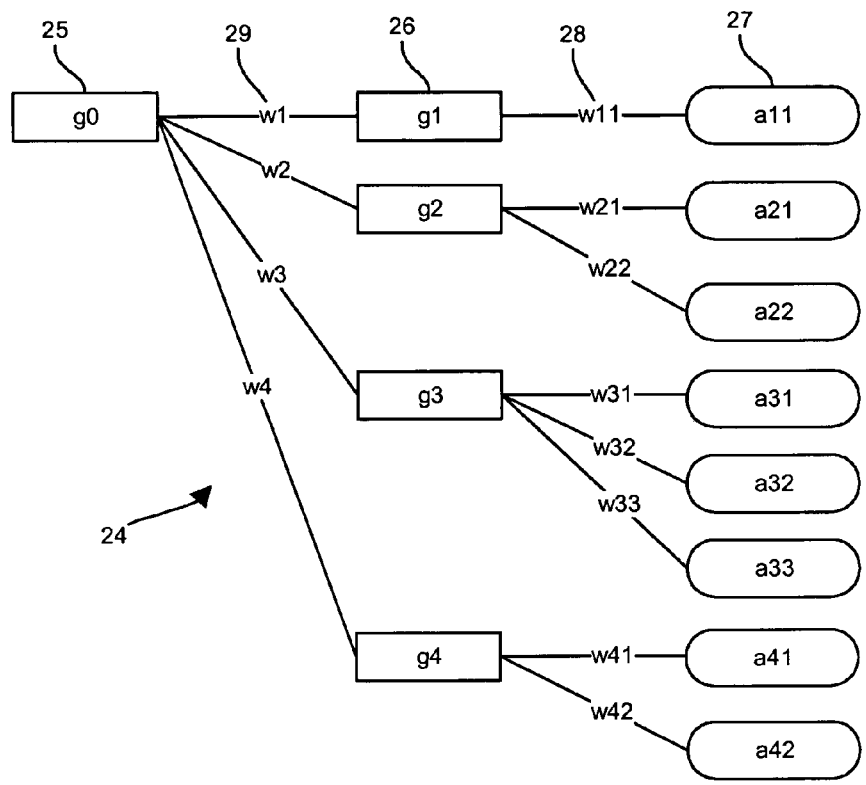
FIG. 5 illustrates a hierarchy of financial goals, attributes, and weights.

FIG. 5 illustrates a goals hierarchy of financial goals, attributes, and weights. In FIG. 5, the goals hierarchy 24 has two layers of financial goals. The first layer has one financial goal 25, financial goal g0, and the second layer has four financial goals 26, financial goals g1, g2, g3, and g4. Financial goals g1, g2, g3, and g4 are dependent from financial goal g0, and financial goal g0 is a parent financial goal for financial goals g1, g2, g3, and g4. To solve financial goal g0, the four financial goals g1, g2, g3, and g4 are used.

In block 16 of FIG. 4, attributes are determined for the financial goals. Attributes are the real-world native measures which are used to quantify the achievement of a financial goal. For example, the financial goal of "achieved income level" may be measured by the attribute of "present value income," which has the measure of "present value dollars per month." Each financial goal of the goals hierarchy has at least one financial goal, at least one attribute, or a combination of at least one financial goal and at least one attribute dependent from the financial goal. In the goals hierarchy, nothing is dependent from an attribute, and attributes form the bottom of the goals hierarchy.

In FIG. 5, eight attributes 27 are dependent from the four financial goals 26. Specifically, goal g1 has one attribute a11, goal g2 has two attributes a21 and a22, goal g3 has three attributes a31, a32, and a33, and goal g4 has two attributes a41 and a42.

In block 17, a single utility function (SUF) is determined for each attribute. A SUF is expressed as a utility curve. The independent axis, or abscissa, of the utility curve is the measure of the attribute (e.g., present value dollars per month), and the dependent axis, or ordinate, of the utility curve is a utility scale having values between 0 and 1.

Figure 6A:
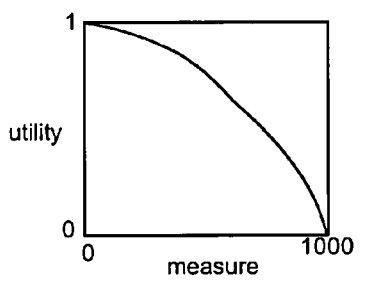
FIGS. 6A, 6B, and 6C illustrate single utility functions.
Figure 6B:
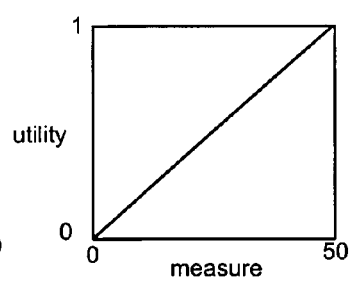
Figure 6C:
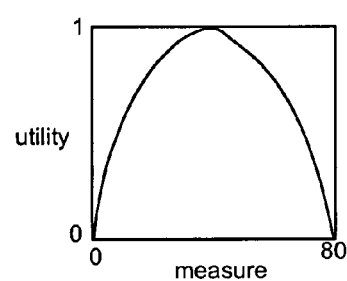

FIGS. 6A, 6B, and 6C illustrate three exemplary SUFs for three attributes. The SUF in FIG. 6A has an arc shape, has an independent axis ranging from 0 to 1000, and has a dependent axis ranging from 0 to 1. The SUF in FIG. 6B has a linear shape, has an independent axis ranging from 0 to 50, and has a dependent axis ranging from 0 to 1. The SUF in FIG. 6C has a bell-shaped curve, has an independent axis ranging from 0 to 80, and has a dependent axis ranging from 0 to 1.

In block 18, a weight is determined for each attribute, and the sum of the weights for the attributes of a financial goal is always 1. If a financial goal has a single weight attribute, the weight for the attribute is 1. If a financial goal has two or more attributes, the relative utility for each attribute of the financial goal is determined, and the sum of the weights for the attributes is 1.

In FIG. 5, eight weights 28 are associated with the eight attributes 27. Each attribute 27 has one weight 28 associated with the attribute. Specifically, weight w11 is associated with t, attribute a11, weight w21 is associated with attribute a21, and so forth.

In block 19, a weight is determined for each financial goal in the goals hierarchy. The weight indicates the importance that a financial goal carries in accomplishing a parent financial goal from which the financial goal is dependent as compared to the other peer financial goals dependent from the parent financial goal. As with the weights for the attributes, the sum of the weights for the financial goals dependent from a parent financial goal is always 1. The selection of the weights for the financial goals is discussed further below.

In FIG. 5, four weights 29 are associated with the four financial goals 26. Each financial goal 26 has one weight 29 associated with the financial goal. Specifically, weight w1 is associated with financial goal g1, weight w2 is associated with financial goal g2, and so forth.

In block 20, a MUF is obtained for the goals hierarchy of financial goals, attributes and weights.

For the MUF of block 20, input from a financial planner determines the financial goals, the SUFs for the attributes, and the weights for the attributes. The weights for the financial goals are determined using investor financial preferences obtained from an investor, input obtained from a financial planner, or a combination of investor financial preferences obtained from an investor and input obtained from a financial planner. The selection of the weights for the goals is discussed below with respect the preference model in block 4 of FIG. 1.

The problem to be solved dictates the number of layers of financial goals, the number of financial goals, and the number of attributes. At a minimum, the hierarchy should contain one layer of financial goals, one financial goal, and one attribute for the financial goal.

The goals hierarchy illustrated in FIG. 5 can be expressed using the following equation:

$$u = \sum_g \left( w_g * \left( \sum_{g,b} w_{g,b} * a_{g,b}(m_{g,b}) \right) \right) \quad (1)$$

where u is the utility score for the goals hierarchy, $w_g$ are the weights for the financial goals and correspond to the weights 29 in FIG. 5, $w_{g,b}$ are the weights for the attributes and correspond to the weights 28, $a_{g,b}(m_{g,b})$ are the attributes, correspond to the attributes 27, and have a value indicated by the dependent axis in an SUF, such as those illustrated in FIGS. 6A-6C, and $m_{g,b}$ are the measures of the attributes and have a value indicated by the independent axis in an SUF, such as those illustrated in FIGS. 6A-6C. Given a set of measures $m_{g,b}$, the utility score for the set of measures can be determined using equation (1).

The previous discussion employs the additive form of the multi-linear utility equation. Other forms of the multi-linear utility equation can be used, such as the multiplicative form of the multi-linear utility equation. See, for example, Ralph L. Keeney and Howard Raiffa, (1993), *Decisions with Multiple Objectives*, Cambridge, United Kingdom: Cambridge University Press, section 6.3.

Figure 7A:
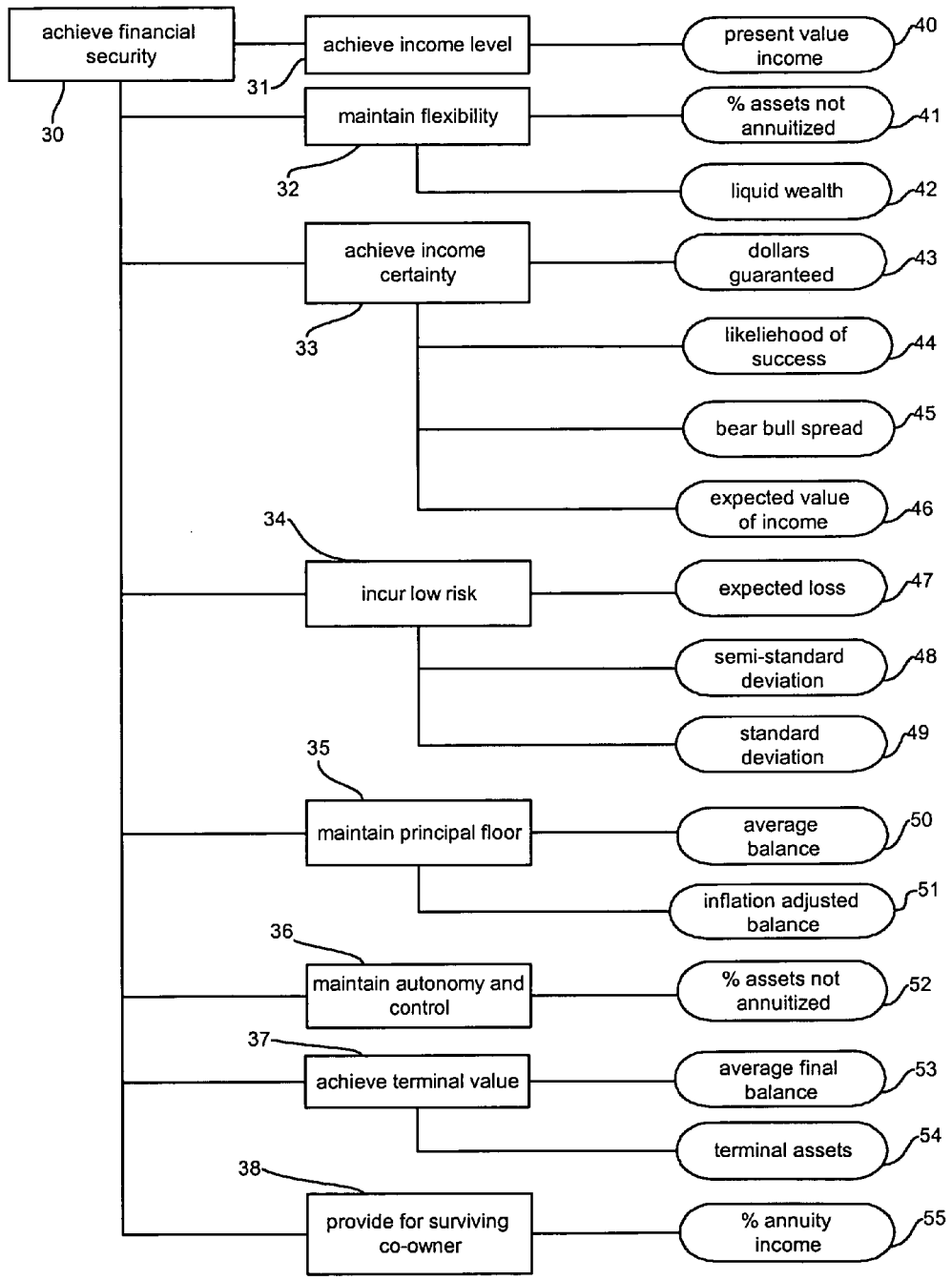
FIGS. 7A and 7B illustrate two goals hierarchies of retirement financial goals with attributes.

FIG. 7A illustrates a goals hierarchy of retirement financial goals and attributes. The goals hierarchy has two layers of financial goals. The first layer of financial goals has one financial goal 30, and the second layer of financial goals has eight financial goals 31-38. The goals hierarchy has sixteen attributes 40-55 associated with the financial goals 31-38 in the second layer.

In FIG. 7A, the single financial goal 30 in the first layer is to achieve financial security. Financial goal 30 is divided into eight financial goals 31-38. Financial goal 31 is to achieve a desired income level. Financial goal 32 is to maintain flexibility (i.e., liquidity) in the portfolio of the investor to deal with unexpected events. Financial goal 33 is to achieve income certainty by having income available to the investor every month without fail. Financial goal 34 is to incur low risk by minimizing exposure to market volatility. Financial goal 35 is to maintain the principal floor by reserving the original amount of the assets invested by the investor. Financial goal 36 is to maintain autonomy and control by having the investor able to change the investment strategy. Financial goal 37 is to achieve a terminal value by having a specific amount of money left at the end of the financial period (i.e., at the end of retirement). Financial goal 38 is to provide for a surviving co-owner, or co-owners, by leaving in the portfolio, for example, an income annuity, such as a variable annuity.

As can be seen, the financial goals 31-38 have friction between them and most likely all cannot be satisfied equally based on the preference of an investor. For example, if an investor wants to achieve a high level of income per financial goal 31, but also wants to achieve a high level of income certainty per financial goal 33, financial goals 31 and 33 are in conflict, because a high level of withdrawals implies less certainty that the withdrawal amount is sustainable for the duration of the financial period. As another example, if an investor wants a high level of flexibility in terms of liquid reserves per financial goal 32, but also wants to provide an income annuity for a surviving spouse per financial goal 38, financial goals 32 and 38 potentially conflict because purchasing an annuity implies sacrificing some or all of the liquidity of the assets used to purchase the annuity.

In FIG. 7A, sixteen attributes 40-55 are depicted. Financial goal 31 has a single attribute 40. Attribute 40 is present value income, which measures the regular withdrawal amount in present value dollars over the financial period as determined on a periodic basis, such as monthly and has units of dollars per month, for example. Present value income is the regular withdrawal amount measured in present value dollars. Another possible attribute for goal 31 is the percentage of target income, which is attribute 56 in FIG. 7B. The percentage of target income compares the present value monthly income provided by a financial strategy to the desired monthly income of the investor and has units of percentage. The percentage of target income is determined by dividing the present value income of attribute 40 at the beginning of the financial period by the desired monthly income of the investor.

Goal 32 has two attributes 41 and 42. Attribute 41 is the percentage of assets not annuitized, which measures pure assets divided by total assets and has units of percentage as measured at the beginning of the financial period. Pure assets refers to the total value of all mutual funds, and total assets refers to the pure assets and all annuities. Attribute 42 is liquid wealth, which measures the cash out over the financial period and has units of dollars. The average cash out is the average cash value of the total assets of the investor as measured at each anniversary of the financial period. For annuitized assets, the cash value is $0 after any liquidity period included in the annuity option has ended.

Goal 33 has four attributes 43-46. Attribute 43 is dollars guaranteed, which measures the monthly minimum payment guaranteed by any annuity contract and has units of dollars per month at the beginning of the financial period. Attribute 44 is the likelihood of success of achieving a specified periodic income over the financial period, which measures the number of successful Monte Carlo simulations of a financial strategy divided by the total number of Monte Carlo simulations of the financial strategy and has units of percentage. Successful Monte Carlo simulations are those Monte Carlo simulations of a financial strategy that achieved the specified periodic income of the investor over the financial period. Attribute 45 is bear bull spread, which measures the lowest percentage certainty-based maximum withdrawal rate subtracted by a current model percentage certainty maximum sustainable withdrawal rate and has units of percentage. Bear bull spread refers to the difference between the strategy being modeled and the most lucrative (but less certain) strategy. Attribute 46 is expected value of income, which measures the certainty-weighted value of the monthly income provided by the strategy over the duration of the financial period. For example, if a strategy provides $2,000 per month, $1,000 of which is initially provided by a guaranteed (100% certain) annuity contract and $1,000 of which is initially provided by mutual funds at 70% likelihood of success, the expected value of the annuity income is $1,000 ($1,000*100% certainty) and the expected value of the mutual find income is $700 ($1,000*70% certainty), for a total expected value of $1,700 initially. This calculation is repeated for each year of the financial period to account for the shifting proportion of income provided by a non-inflation-adjusted guaranteed annuity income vis-à-vis the income from the mutual funds, and the resulting attribute is the average of the sum of all measures over the duration of the financial period Goal 34 has three attributes 47-49. Attribute 47 is expected loss, which measures the minimum total return for all Monte Carlo simulations of a financial strategy and has units of percentage. The total return includes both mutual funds and variable annuities for the financial period. Attribute 48 is semi-standard deviation, which measures the semi-standard deviation of the rates of return over the financial period for the Monte Carlo simulations of a financial strategy and has units of percentage. The semi-standard deviation is the square root of the semi-variance. The semi-variance is determined by first summing all the squared differences from the mean of all the observations less than the mean and second dividing the summed result by the total number of observations. Attribute 49 is standard deviation, which measures the standard deviation of the rates of return over the financial period for the Monte Carlo simulations of a financial strategy and has units of percentage. Another possible attribute for goal 34 is the asset allocation index, which measures the volatility of the various asset allocations of the asset allocation financial variable. The asset allocation index has dimensionless units with values from 1 to the total number of asset allocations, which is 13 for the asset allocation financial variable illustrated in FIG. 2. The various asset allocations are ranked from the least volatile asset allocation, which has the lowest percentage of stocks and has an asset allocation index of 1, to the most volatile asset allocation, which has the highest percentage of stocks and has an asset allocation index equal to the total number of asset allocations.

Goal 35 has two attributes 50 and 51. Attribute 50 is average balance, which measures the average year-end balance during the financial period as compared to the initial balance and has units of percentage. Attribute 50 is calculated by dividing the average of the year end balances for the financial period by the investor's starting balance for all Monte Carlo simulations of a financial strategy. Attribute 51 is inflation adjusted balance, which measures the average fluctuation in the investor's balance from year to year vis-à-vis the fluctuation due to inflation and has units of percentage. Attribute 51 is calculated as the average of each year-end balance during the financial period divided by the previous year's year-end balance as multiplied by the previous year's inflation rate. The average is calculated across all Monte Carlo simulations of a financial strategy.

Goal 36 has one attribute 52. Attribute 52 is the percentage of assets not annuitized and is the same as attribute 41.

Goal 37 has two attributes 53 and 54. Attribute 53 is average final balance of the assets, which measures the average final balance for all Monte Carlo simulations of a financial strategy and has units of dollars as measured at the end of the financial period. Attribute 54 is terminal assets, which measures the ratio of the average final balance of the assets to the target final balance (terminal value) as defined by the investor and has units of percentage as measured at the end of the financial period. Attribute 54 is calculated by dividing the average final balance, as calculated across all Monte Carlo simulations of the financial strategy, by the target final balance. The average final balance is calculated as for attribute 53, and the target final balance is defined by the investor.

Goal 38 has a single attribute 55. Attribute 55 is the percentage of annuity income, which measures the percentage of total income provided by a financial strategy that is generated by the annuitized assets and has units of dollars. Attribute 55 is calculated by dividing the sum of all present value annuity income (for all months of the financial period in all Monte Carlo simulations) by the sum of all present value total income (for all months of the financial period in all Monte Carlo simulations).

For each of the attributes 40-55, an SUF is determined using the input from a financial planner.

Figure 7B:
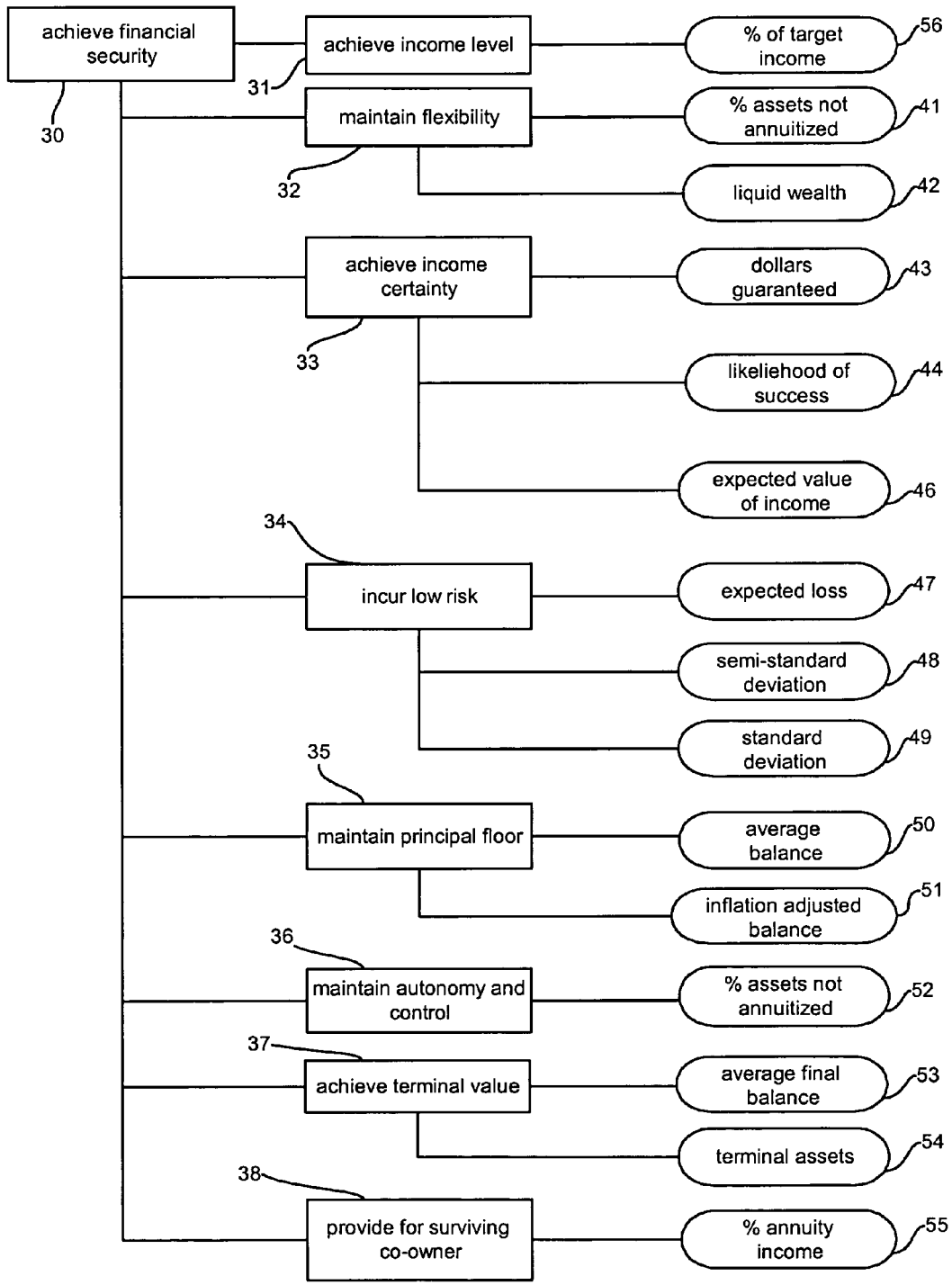

The goals hierarchy in FIG. 7A was determined for the purpose of retirement. Goals hierarchies for other purposes can likewise be determined. The financial goals and attributes for other purposes may be the same or similar to the financial goals and attributes in FIG. 7A. For example, FIG. 7B illustrates a goals hierarchy of retirement financial goals as in FIG. 7A, but with different attributes. Specifically, in FIG. 7B, the attribute for goal 31 (achieve income level) is changed from attribute 40 (present value income) to attribute 56 (percentage of target income), and attribute 45 (bear bull spread) is removed from goal 33 (achieve income certainty). In general, for retirement financial goals, the goals hierarchy and attributes illustrated in FIG. 7B is preferable to the goals hierarchy and attributes illustrated in FIG. 7A.

Investor Input

To determine the weights for the financial goals in the MUF of block 2 and to provide information to the projection engine in block 5 of FIG. 1, input from the investor is sought. In block 3 of FIG. 1, a questionnaire is provided to the investor and is completed with information concerning the investor. The questionnaire is completed by the investor, another acting on behalf of the investor, or a financial counselor after interviewing the investor.

The questionnaire queries the investor for three categories of information: investor financial preferences, investor assets, and investor personal data. From the categorical information gained from the questionnaire, the investor financial preferences are provided to block 4 in FIG. 1 and the investor financial preferences, investor assets, and investor personal data are provided to the projection engine in block 5 of FIG. 1. Information from the investor gained from the questionnaire is stored on a computer-readable medium.

For the first category of investor financial preferences, the questionnaire contains a number of questions to evoke the preferences from the investor regarding the various financial goals for the MUF determined in block 2. The number of questions is equal to the number of financial goals requiring weights. For each question, the investor is asked to rate the importance of the question on a scale, for example, of from 0 to 10, where 0 represents no importance and 10 represents the most important. The ratings provided by the investor for each question are used to determine the weights for the financial goals. Each question in the questionnaire has a one-to-one correspondence to one of the financial goals in the goals hierarchy. Because of this relationship, the weights for the financial goals can be uniquely determined. For example, referring to FIG. 5, if question 1 of the questionnaire is paired with goal g1, the rating given to question 1 by the investor is used to determine weight w1.

The weights can be determined using a number of techniques. For example, the weights can be determined using the "swing weight" technique of assessing preferences, where each rating provided by the investor in the questionnaire illustrated in FIG. 8 is divided by the sum of the ratings provided by the investor.

Alternatively, other techniques can be used to determine the weights. For example, the tradeoff technique can be used, where the weights are determined by pair-wise comparisons between measures that define pairs of equally preferred alternatives. As another example, the direct entry technique can be used, which involves directly entering the weights ranging from 0.0 to 1.0. The weights are next either normalized to sum to 1.0 or used to define a multiplicative MUF. As another example, the pair-wise weight ratios technique can be used, which is similar to the tradeoff technique, except that instead of defining a complete tradeoff, the ratio between the weights of any two sub-goals is entered. As another example, the analytic hierarchy process (AHP) technique, which is an extension of the pair-wise weight ratios technique, can be used. Instead of entering the ratios for selected pairs of sub-goals as in the pair-wise weight ratios technique, the ratios are entered for all pairs of sub-goals.

Additionally for investor financial preferences, the questionnaire queries the investor for two target dollar amounts. First, the investor is asked to state a desired periodic income amount for the financial period. For example, the desired periodic income amount is monthly and is in pre-tax, present value dollars. Second, the investor is asked to state a desired terminal value, or ending balance, for the assets of the investor at the end of the financial period. The desired terminal value is expressed in, for example, pre-tax, future-value dollars. As an option, the investor may designate the desired terminal value to be whatever is left in the assets.

For the second category, the questionnaire queries the investor as to investor assets. The investor is asked to provide detailed information on tax-deferred assets and taxable assets. Such detailed information includes, for example, the type of assets, the present value of the assets, and current interest rates. Types of tax-deferred assets include IRAs and employer plans. IRAs that are tax-deferred assets include traditional IRAs and Roth IRAs. Employer plans that are tax deferred assets include 401(k), 403(b), simple IRA, Keogh, money purchase plans, profit sharing plans, and SEP IRAs. For tax purposes, the investor is asked to provide information on currently held taxable assets and revocable living trusts.

For existing deferred annuities, the investor is asked to provide information on ownership of the annuity, value of the annuity, and the type of annuity. For each tax-deferred asset and taxable asset, the investor is asked to provide information on the total balance of the asset at the start date of the financial period. The investor is asked to provide information on contributions to the assets during the financial period, including information on the dollar amount of the contributions, the frequency of the contributions, the start date for the contributions, and the end date for the contributions.

For the third category, the questionnaire queries the investor for investor personal data. Examples of investor personal data include: name; state of legal residence; gender; date of birth; marital status; personal data on co-owners of the assets; start date for financial period; length of financial period; and beneficiary information.

FIG. 8 illustrates a completed questionnaire for the retirement financial goals illustrated in FIG. 7A. The questionnaire includes eight questions 61-68. Each question includes a rating area 69 for the investor to rate the importance of each question. The questionnaire includes a fill-in area 70 for the desired monthly income of the investor, and a fill-in area 71 for the desired terminal value for the assets of the investor.

In FIG. 8, the investor has filled in the boxes in the rating area 69 corresponding to the preferences of the investor to each of the questions 61-68. The investor has rated the importance of the financial goal identified by question 61 as 3, the importance of the financial goal identified by question 62 as 7, and so forth. The investor has indicated a desired monthly income of $1,500 and a desired terminal value as not being applicable. The questionnaire also queries the investor as to the total assets of the investor, which is $350,000 for this example. Each of the questions 61-68 corresponds to each of the financial goals 31-38 in FIG. 7, respectively. Using the ratings 69 provided for each question 61-68, the weights for the financial goals 31-38 are determined.

An information storage device embodies the questionnaire for an investor. The questionnaire embodied in an information storage device is provided by a financial counselor to the investor for completion, and the investor provides the completed questionnaire to the financial counselor. The providing of the information storage device with the questionnaire from the financial counselor to the investor and the providing of the completed questionnaire from the investor to the financial counselor has many possibilities, for example, mailing, faxing, e-mailing, and using a web site on the Internet.

For an information storage device in paper form, the financial counselor provides the questionnaire to the investor via the mail, and the investor completes the questionnaire and provides the questionnaire back to the financial counselor via the mail. Alternatively, the investor can complete the questionnaire at the office of the financial counselor.

In paper form, the questionnaire can be embodied as a fill-in-the-blank paper or a computer-readable paper to gather the information from the investor. For a fill-in-the-blank paper, the information from the investor is keyed into a computer. For a computer-readable paper, the investor can provide information on a bubble sheet or in printed characters. The information provided by the investor on the computer-readable paper is scanned into a computer and if the information is printed characters, the information is processed using character recognition software.

For an information storage device in electronic form, the financial counselor provides the questionnaire to the investor using a computer-readable medium. For example, the financial counselor provides to the investor via the mail a floppy disk containing a software-implemented questionnaire, and the investor completes the questionnaire using a computer, stores the information on the floppy disk using the computer, and provides the floppy disk to the financial counselor via the mail.

As another example of a software-implemented questionnaire, a computer is located at the office of the financial counselor, and includes a computer-readable medium having the software-implemented questionnaire. The investor visits the office of the financial counselor and completes the questionnaire using the computer located at the office of the financial counselor.

As another example of a software-implemented questionnaire, the software-implemented questionnaire resides on a first computer having a computer-readable medium. The questionnaire is transferred electronically from the first computer to a second computer at the office of the financial counselor or to a third computer operated by the investor. Once the questionnaire is completed, the completed questionnaire is electronically transferred from the second or third computer to the first computer for processing. The questionnaire can be transferred electronically, for example, via e-mail or downloading.

As another example of a software-implemented questionnaire, the financial counselor operates a web site on the Internet, and the investor accesses the software-implemented questionnaire via the web site and completes the questionnaire.

As another example of a software-implemented questionnaire, the financial counselor provides the software-implemented questionnaire to the investor via e-mail, and the investor completes the questionnaire and provides the completed questionnaire back to the financial counselor via e-mail.

Preference Model

In block 4 of FIG. 1, a preference model is created using the MUF from block 2 and the investor financial preferences from block 3. The target weights for the financial goals are determined using a combination of the investor financial preferences provided by the investor and input provided by a financial planner. For the example of the goals hierarchy in FIG. 5, the weights 29 are determined in block 4 using a combination the investor financial preferences provided by the investor and input from a financial planner.

Once the weights for the financial goals in the goals hierarchy are determined, a preference model is obtained for the investor. This preference model is used in block 8 of FIG. 1 to obtain a utility score for each of the financial strategies.

Referring to equation (1), everything except the weights $w_g$ were determined in block 2. In block 4, the weights $w_g$ are determined, and this determination is discussed for three cases: first, the weights $w_g$ are determined using only the investor financial preferences; second, the weights $w_g$ are determined using only the input of a financial planner; and third, the weights $w_g$ are determined using a combination of the investor financial preferences and the input of a financial planner.

For the first case, the weights $w_g$ of the financial goals are determined using only the investor financial preferences. For the goals hierarchy expressed with equation (1), the weights $w_g$ of the financial goals are determined with the following equation:

$$w_g = p_g \bigg/ \sum_g p_g \qquad (2)$$

where $p_g$ are the preference ratings provided for the questions on the questionnaire and the denominator is the summation of all the preference ratings. Using equation (2), the sum of all the weights $w_g$ is 1.

For equation (2), it is assumed that that the answer to each question in the questionnaire has one-to-one relationship with a weight for a financial goal in the goals hierarchy. Such a relationship exists between the financial goals 31-38 in the goals hierarchy of FIG. 7A and questions 61-68 in the questionnaire of FIG. 8, respectively. For the questionnaire in FIG. 8, the preference ratings $p_g$ have values between 0 and 10, and the variable g corresponds to the number of questions and has values between 1 and 8.

For the second case, the weights $w_g$ are determined using only the input of a financial planner. For the goals hierarchy expressed with equation (1), the weights $w_g$ of the financial goals are determined with the following equation:

$$w_g = f_g \bigg/ \sum_g f_g \tag{3}$$

where $f_g$ are the preference ratings provided for the questions on the questionnaire by a financial planner and the denominator is the summation of all the preference ratings. Using equation (3), the summation of all the weights $w_g$ is 1. Alternatively, a financial planner can directly assign the weights $w_g$ such that the sum of all the weights $w_g$ is 1.

For the third case, the weights $w_g$ are determined using a combination of the investor financial preferences and the input of a financial planner. For the goals hierarchy expressed with equation (2), the weights $w_g$ of the financial goals are determined with the following equation:

$$w_g = \frac{\alpha(p_g / \sum p_g) + (1-\alpha)(f_g / \sum f_g)}{\sum [\alpha(p_g / \sum p_g) + (1-\alpha)(f_g / \sum f_g)]} \tag{4}$$

where all the summations are over the variable g and $\alpha$ ranges from 0 to 1 and determines how much the investor financial preferences and the input of the financial planner are blended together.

For $\alpha=1$, equation (4) reduces to equation (2), and for $\alpha=0$, equation (4) reduces to equation (3). For a combination that is biased toward the input of a financial planner, $\alpha$ should be approximately 0.3. For a combination that is biased toward the investor financial preferences, $\alpha$ should be set to approximately 0.7. Any value of $\alpha$ from 0 to 1 can be used to obtain a desired blending of the investor financial preferences and the input of a financial planner.

To determine the weights $w_g$ using equations (2)-(4), it is assumed that the goals hierarchy has two layers, that the first layer has a single financial goal, and that the answer to each question in the questionnaire has one-to-one relationship with a weight for a financial goal in the goals hierarchy. If any of these assumptions do not hold, equations (2)-(4) do not apply and appropriate relationships must be determined using equations (2)-(4) as guides.

Projection Engine

In block 5 of FIG. 1, a projection engine determines a measure for each attribute in the preference model of block 4 for each financial strategy of block 1. The projection engine uses investor financial preferences, investor assets, and investor personal data from block 3 and a time series database from block 6.

The projection engine measures the performance of the various financial strategies to determine values for the attributes defined in the preference model of block 4. The projection engine generates a series of hypothetical financial projections using the investor assets and other constraints for each financial strategy.

To create a series of unique hypothetical financial projections for each financial strategy, the projection engine accesses the time series database from block 6. The time series database is created through Monte Carlo simulations and includes deviations for a zero rate of return for each sub-asset class in the asset allocation. The rates of return for each sub-asset class are generated by the projection engine of block 5 by combining a selected average rate of return for the sub-asset class with the deviations for the zero rate of return for the sub-asset class. Instead of using Monte Carlo simulations to generate deviations for a zero rate of return for each sub-asset class, Monte Carlo simulations can be used to generate directly the rates of return for each sub-asset class, and these rates of return for each sub-asset class are then stored in the time series database of block 6. Instead of using Monte Carlo simulations, other techniques, such as using rolling periods of historical data, can be used to populate the time series database of block 6.

Monte Carlo simulations are a technique used for modeling uncertainty and volatility. With Monte Carlo simulations, uncertain values in an equation, such as future rates of return, are replaced with randomly generated numbers, and the equation is recalculated numerous times to produce numerous results. If an equation has one or more uncertain values, each uncertain value is replaced with a random number, and a result for the equation is calculated based on the random numbers. This replacement and calculation is repeated numerous times and is referred to as Monte Carlo simulations of the equation. Each replacement and calculation is referred to as a Monte Carlo simulation, and the result of the calculation is referred to as a simulated result. A further discussion of Monte Carlo simulations can be found in the following, which is incorporated herein by reference: David Vose, "Quantitative Risk Analysis: A Guide to Monte Carlo Simulation Modelling," John Wiley & Sons, Ltd., Chichester, England, 1996.

In a Monte Carlo simulation, the random number generated is based on the shape of the desired probability distribution and certain parameters, such as the average of the random numbers and a range of possible values for the random number. The number of Monte Carlo simulations to perform is proportionate to the amount of accuracy desired in the simulated results. To increase the accuracy of the simulated results, the number of Monte Carlo simulations should be increased. However, increasing the number of Monte Carlo simulations increases the processing time.

The process of generating the deviations for the zero rate of return for each sub-asset class using Monte Carlo simulations preferably does not occur dynamically at run-time. The deviations for the zero rates of return are generated once, stored in the time series database of block 6, and are accessed from block 6 at run-time for each financial strategy. When accessed by the projection engine of block 5 at run-time, the deviations for the zero rate of return for each sub-asset class are combined with the selected average rate of return for each sub-asset class to obtain the rates of return for each sub-asset class.

For financial planning, each Monte Carlo simulation is used to derive a deviation of a zero rate of return for a particular sub-asset class for a particular time duration, such as a month or year, in the financial period. A probability distribution for each sub-asset class to be simulated is determined based on historical data of the sub-asset class or from input provided by a financial planner. Using the determined probability distribution for a particular sub-asset class, a random number generator produces a random number for the deviation of a zero rate of return for the particular time duration for the particular sub-asset class.

Monte Carlo simulations use probability distributions to generate a range of possible values for a given variable. For the financial strategies in block 1, the future rates of return for the various sub-asset classes in the asset allocation financial variable in the multi-dimensional matrix, such as that illustrated in FIG. 2, are unknown. Future rates of return are unknown because they have not yet occurred. To predict how the various sub-asset classes will perform in the future, Monte Carlo simulations are used to project various future rates of return for each sub-asset class.

The probability distribution for a rate of return for a sub-asset class can be based on a standard probability distribution, such as the Gaussian probability distribution. The input of a financial planner dictates which standard probability distribution is used. If a Gaussian probability distribution is used to model the future rate of return of a sub-asset class, the mean and mean standard deviation of the rate of return for an historical period of the sub-asset class can be used as the parameters of the corresponding Gaussian probability distribution. Alternatively, the actual minimum and maximum values for both the rate of return and standard deviation of the rate of return can also be used to define the probability distribution to ensure that the results generated closely model the historical period. Preferably, an unbounded Gaussian probability distribution (i.e., no imposed maximum or minimum values) can be used to model possible future extreme scenarios that have not occurred in the past.

Historical data of the rate of return for a sub-asset class can be used to provide the mean, standard deviation, and/or other statistical parameters for the Gaussian probability distribution of each sub-asset class. The historical period analyzed to derive this data could vary for each sub-asset class, depending on the purposes of the projection. As an example, a Gaussian probability distribution can be used to model the rate of return for the sub-asset class of large-cap stocks based upon the historical performance of the S&P 500 Index. Preferably, the probability distribution for a rate of return for a sub-asset class can be determined by a financial planner based upon both historical data and recent market trends and/or projections.

Preferably, to determine the rates of return for each sub-asset class, the time series database of deviations in block 6 is generated for a zero rate of return. With this approach, positive and negative deviations are generated and are applied to an average rate of return for a sub-asset class to determine the rates of return for the sub-asset class. The average rate of return for a sub-asset class is determined by a financial planner based upon both historical data and recent market trends and/or projections.

Further, when several sub-asset classes are modeled, a covariance matrix is preferably used to generate the deviations of the zero rate of return. Using historical data for the same periods for each sub-asset class, the covariance matrix is constructed to establish the relationships between each of the sub-asset classes. By utilizing the covariance matrix, the rates of return for each sub-asset class provide a realistic simulation of possible future scenarios.

Preferably, for each financial strategy, the projection engine accesses the deviations of the zero rate of return for each sub-asset class in the time series database of block 6. Using the accessed deviations of the zero rate of return, the selected average rate of return for each sub-asset class, and the features of the financial strategies, the projection engine determines the rate of return for each sub-asset class for period intervals for numerous financial periods. In this way, the projection engine determines the simulated performance for each financial strategy over the financial periods. Each financial period is referred to as a scenario.

As an example, if seven sub-asset classes are used interchangeably among the financial strategies for 500 fifty-year scenarios having a monthly periodic interval, the projection engine accesses 2,100,000 deviations of the zero rate of return from the time series database 6 and uses the accessed 2,100,000 deviations to determine the simulated performance of the financial strategies. The number of accessed deviations is determined from: (12 deviations/year)*(50 years/scenario) *(7 sub-asset classes/financial strategy)*(500 scenarios)=2,100,000 deviations of the zero rate of return of sub-asset classes/financial strategy.

Once the Monte Carlo simulation results have been gathered, the rates of return have been determined for each sub-asset class, and the financial strategies have bee simulated for the financial period using the rates of return for each sub-asset class, statistical analysis can be applied to determine information on the financial strategies. For example, the expected value, standard deviation, best and worst case scenarios, and the probability of reaching specific values can be determined for the financial strategies. This statistical analysis is performed in block 7 for the measures of the attributes.

Figure 9:
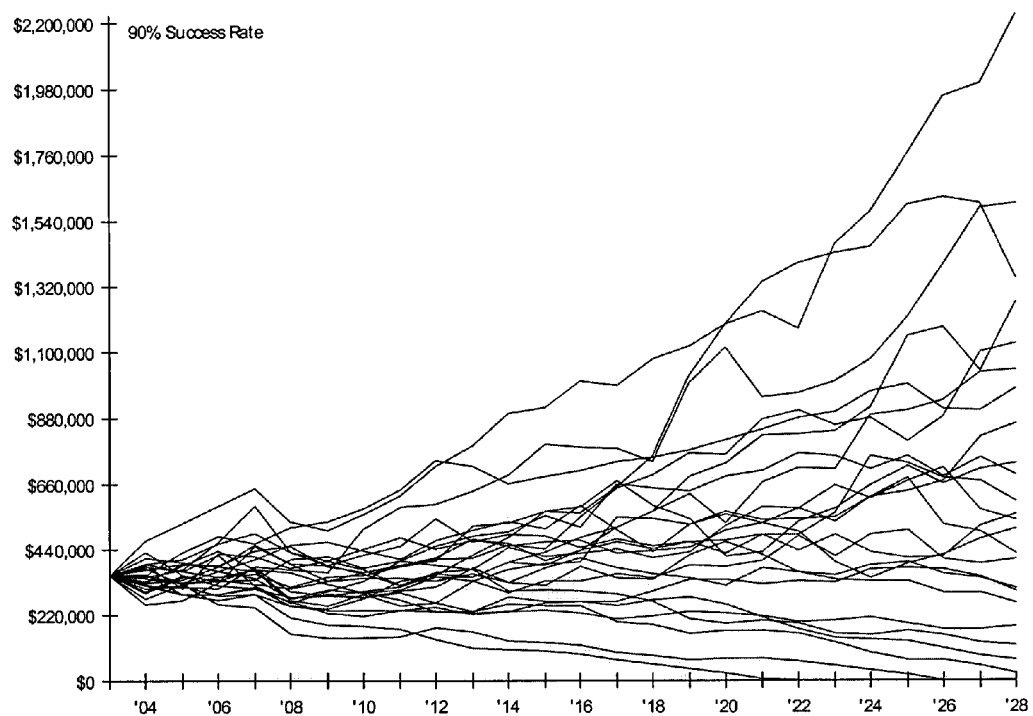
FIG. 9 illustrates the results of numerous Monte Carlo simulations.
Figure 18:
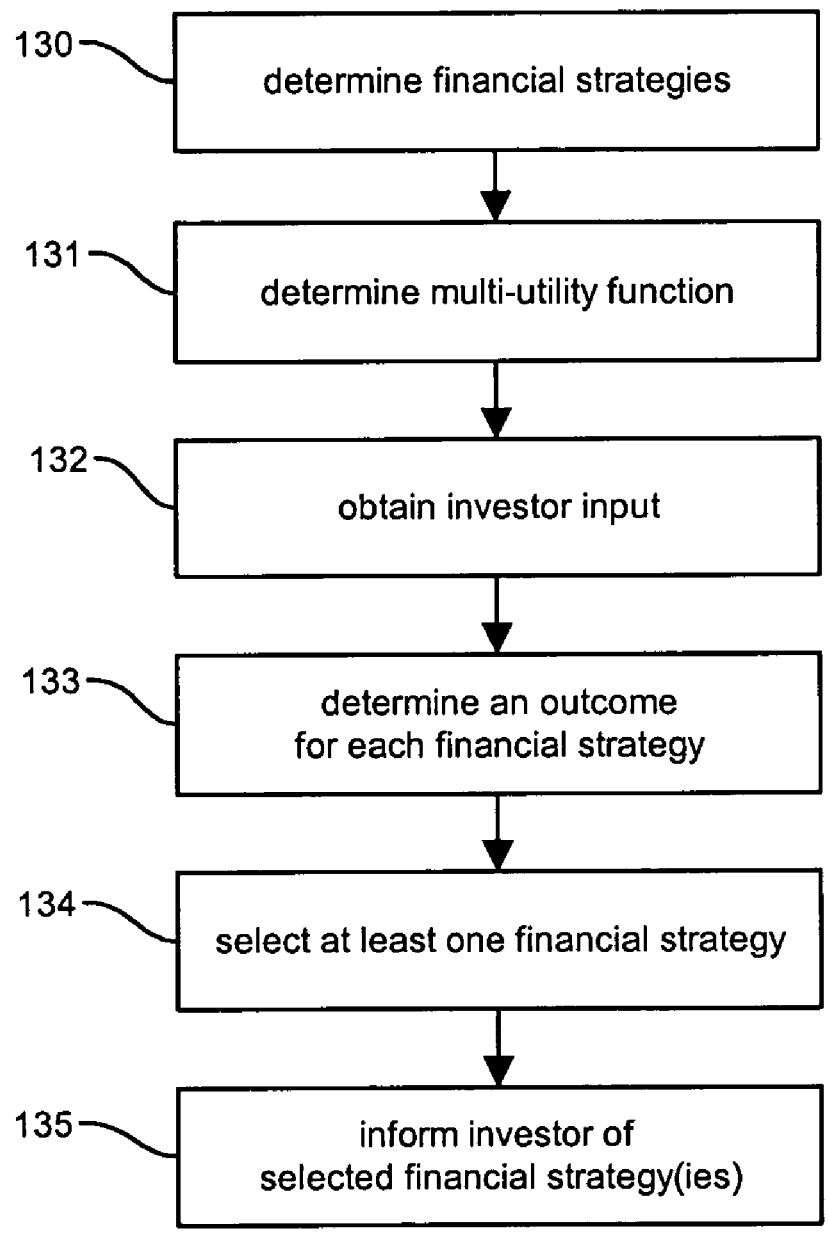
FIG. 18 illustrates a flow diagram for the operation of the invention.

FIG. 9 illustrates the results of numerous Monte Carlo simulations for one financial strategy for the investor completing the questionnaire of FIG. 8. The financial period is 24 years (from 2003 to 2027), the initial assets of the investor are $350,000, and the investor financial preference for a desired monthly payment is $1,500. The financial strategy simulated corresponds to one of the cells in the multi-dimensional matrix of financial variables in FIG. 2 and has a product mix of 100% mutual funds and 0% annuities, an asset allocation for mutual funds of 70% stocks and 30% bonds, and 0% short-term securities, an asset allocation for variable annuities of 95% stocks, 3% bonds, and 2% short-term securities, and a likelihood of success of 90%. Although separate asset allocations are provided for mutual funds and for variable annuities, a single asset allocation financial variable is used.

FIG. 9 depicts the total assets for 25 financial period scenarios. The independent axis of FIG. 9 is the duration of the financial period, which is 24 years, and has units of years, and the dependent axis is the total assets from year to year. The projection engine simulated 500 scenarios, and the 25 curves in FIG. 9 correspond to 25 of the 500 scenarios. Each of the 500 scenarios was ranked based on ending balance, and the ranked scenarios were divided into 25 percentiles. The median scenario of each percentile, which is the tenth scenario of the 20 scenarios in that percentile, was selected and is shown in FIG. 9. The values for each curve are the year-end balances of the total assets for each scenario.

In FIG. 9, nine scenarios ended the financial period with less total assets than the initial total assets of $350,000. Of these nine scenarios, two scenarios ran out of money before the end of the financial period, one in simulated year 2021 and one in simulated year 2026. The remaining 16 scenarios ended the financial period with more total assets than the initial total assets. The results of the Monte Carlo simulations illustrated in FIG. 9 exemplify the wide range of possible results that can occur for a financial strategy.

In addition to or instead of utilizing Monte Carlo generated rates of return for various sub-asset classes, Monte Carlo generated numbers can be utilized for other variables. For example, Monte Carlo generated numbers can be used for the rate of inflation, as well as the average returns, volatility, and correlation factors of the sub-asset classes themselves.

As an option, the time series database of Monte Carlo generated rates of return can include serial correlation. The usage of serial correlation establishes a dependency in the rates of return within each sub-asset class between any two successive periodic durations in a financial period.

As an option, the time series database can be generated to represent common economic trends such as sustained periods of prosperity or adversity at key projection points (e.g., the beginning, middle, or end) over the financial period.

Attribute Measures

In block 7 of FIG. 1, the results from the Monte Carlo simulations performed by the projection engine are used to determine measures for each attribute for each financial strategy. For each financial strategy, the numerous Monte Carlo simulations performed for the financial strategy are analyzed, and the measure for each attribute in the goals hierarchy from block 2 is determined.

FIG. 10 illustrates the measures calculated from a number of Monte Carlo simulations for a single financial strategy. The fifteen attributes in FIG. 10 correspond to the fifteen attributes illustrated in FIG. 7A for the goals hierarchy of retirement financial goals and attributes. To the right of each attribute is the calculated measure 75 for the attribute. These measures 75 are calculated based on the results of the 500 Monte Carlo simulated scenarios for the financial strategy discussed above for FIG. 9. For example, the measure 75 for attribute 40 of present value income is $1,120, the measure 75 for attribute 41 of percentage of assets not annuitized is 0.70%, and so forth. Measure 75 for attribute 54 of terminal assets is listed as not applicable because the investor listed no desired terminal value in the questionnaire of FIG. 8.

Utility Scores

In block 8 of FIG. 1, the utility scores for each financial strategy are determined using the preference model from block 4 and the measures for each attribute for each financial strategy from block 7. Using the preference model from block 4, the measures from block 7 are input, and a utility score for each financial strategy is determined.

Referring to equation (1), the utility score for each financial strategy can be expressed using the following equation:

$$u(s) = \sum_g \left( w_g * \left( \sum_{g,b} w_{g,b} * a_{g,b}(m_{g,b}(s)) \right) \right) \quad (5)$$

where s is the number of financial strategies, u(s) is the utility score for financial strategy s, and $m_{g,b}(S)$ is the measure for attribute $a_{g,b}$ for financial strategies.

As an example using the goals hierarchy illustrated in FIG. 7A and the measures for the attributes in FIG. 10, equation (5) is used to calculate the utility score 76 in FIG. 10 for the financial strategy. In FIG. 10, the measures 75 are used with equation (5) to calculate the utility score 77, which is 0.723510.

Strategy Selection

In block 9 of FIG. 1, the financial strategies are ranked, and at least one financial strategy is selected. The utility scores and attribute measures for each financial strategy are passed from block 8 to block 9. The financial strategies are ranked based on the utility scores of the financial strategies. The financial strategy having the highest utility score is selected as the overall best financial strategy for the investor. Alternatively, two or more of the top ranked financial strategies are selected as the overall best financial strategies for the investor.

In addition to selecting financial strategies based on the utility score, other heuristics can be used to rank and select the best financial strategies for the investor. For example, the financial strategies can be ranked based on the measures from an attribute. For instance, referring to FIG. 7A, the financial strategies can be ranked based on attribute 40 of the present value income of a financial strategy or attribute 53 of the average final balance of a financial strategy. One or more financial strategies ranked the highest using one or more heuristics are selected as the best one or more financial strategies.

FIGS. 11 and 12 illustrate the results from determining the utility scores for a number of financial strategies and correspond to slices in the multi-dimensional matrix illustrated in FIG. 2. The 104 financial strategies in FIG. 11 were derived from the three financial variables illustrated in FIG. 2: an asset allocation of thirteen possible asset allocations (rows 1-13); a likelihood of success ranging from 70% to 99% in steps of 5% (columns 1-7) and the desired monthly income (column 8); and a product mix of 100% mutual funds and 0% variable annuities. The 104 financial strategies in FIG. 12 were also derived from the three financial variables illustrated in FIG. 2: an asset allocation of thirteen possible asset allocations (rows 1-13); a likelihood of success ranging from 70% to 99% in steps of 5% (columns 1-7) and the desired monthly income (column 8); and a product mix of 70% mutual funds and 30% variable annuities. Column 8 of FIG. 12 is blank because the financial strategies corresponding to these cells in the multi-dimensional matrix are not relevant given the responses by the investor in questionnaire. Similar tables can be generated for the other five values of the product mix financial variable in FIG. 2. The strategies illustrated continue the example discussed above with respect to FIGS. 8-10.

Each cell of the multi-dimensional matrix of FIGS. 11 and 12 represents the results from one of the 208 financial strategies depicted. Each cell has five values 80-84. Value 80 is the utility score for the financial strategy. Value 81 is the measure for attribute 53 in FIG. 7A and is the average final balance in dollars of the financial strategy for all of the Monte Carlo simulations. Value 82 is the initial present value income (monthly income) in dollars per month provided by the financial strategy and is taken from the calculations for the measure for attribute 40 in FIG. 7A. Value 83 is the ranking of the financial strategy compared to all of the financial strategies in order of decreasing utility score. The financial strategy having the highest utility score has a ranking of 1. Value 84 is the likelihood of success. For columns 1-7, numerical value 84 is pre-determined, and for column 8, value 84 is based on the results of the Monte Carlo simulations.

The results from the financial strategy illustrated in FIG. 10 are depicted in FIG. 12 in cell 85, which corresponds to asset allocation 13, a product mix of 70% mutual funds and 30% variable annuities, and a likelihood of success of 90%. In this cell, the financial strategy has a utility score of 0.723510, an average final balance of $690,505, and a present value income of $1,120 per month.

If the financial strategies are ranked according to utility score, the highest ranking financial strategy corresponds to cell 85 in FIG. 12. Alternatively, if the three financial strategies having the three highest utility scores are to be recommended to the investor, the three financial strategies corresponding to cells 85, 86, and 87, respectively, in FIG. 12 are selected.

As an option, utility scores and heuristics may be combined to identify a number of strategies to be recommended to an investor. As an example, the three strategies can include the strategy having the highest utility score, the strategy having the highest present value income at 85% likelihood of success, and the strategy having the highest present value income at 70% likelihood of success.

If heuristics are used, the financial strategies are preferably selected using the responses by the investor to the questionnaire of FIG. 8. Specifically, for each heuristic, a subset of the financial strategies is determined based on the responses by the investor to the questionnaire of FIG. 8 and the financial variables, and a financial strategy is selected from the subset based on the responses by the investor to the questionnaire, the financial variables, and the utility scores. Preferably, three subsets of the financial strategies are determined, and one financial strategy is selected from each of the three subsets using three separate heuristics.

For the first heuristic, the first subset of the financial strategies initially has all the financial strategies, and three restrictive decisions for the first subset are made. First, based on the ratings by the investor of financial goal 33 (achieve income certainty) and 38 (provide for surviving co-owner), financial strategies are removed from the first subset according to the product mix financial variable. If financial goal 33 (achieve income certainty) or financial goal 38 (provide for surviving co-owner) is the highest rated financial goal, and if neither financial goal 32 (maintain flexibility), financial goal 35 (maintain principal floor), nor financial goal 36 (maintain autonomy and control) is rated as high as either financial goal 33 (achieve income certainty) or financial goal 38 (provide for surviving co-owner) (although other financial goals may be rated as high as financial goal 33 (achieve income certainty) and financial goal 38 (provide for surviving co-owner)), and if the investor indicated no desired terminal value on the questionnaire, no financial strategies are removed from the first subset. Otherwise, the financial strategies that do not have a product mix of 100% mutual funds and 0% variable annuities are removed from the first subset, and only the financial strategies having a product mix of 100% mutual funds and 0% variable annuities remain in the first subset.

Second, based on the ratings by the investor of financial goal 34 (incur low risk), financial strategies are removed from the first subset according to the asset allocation financial variable. As financial goal 34 (incur low risk) is rated higher in importance, the financial strategies having riskier asset allocations are removed from the first subset. If financial goal 34 (incur low risk) is rated as unimportant, no financial strategies are removed from the first subset.

Third, based on the ratings by the investor of financial goal 33 (achieve income certainty), financial strategies are removed from the first subset according to the likelihood of success financial variable. As financial goal 33 (achieve income certainty) is rated higher in importance, the financial strategies having low likelihood of success are removed from the first subset. For example, if financial goal 33 (achieve income certainty) is rated as 10 in the questionnaire of FIG. 8, financial strategies having a likelihood of success of less than 90% are removed from the first subset, and if financial goal 33 (achieve income certainty) is rated as 9, financial strategies having a likelihood of success of less than 80% are removed from the first subset.

From the derived first subset of financial strategies, a first financial strategy is chosen. If financial goal 31 (achieve income level) is more highly rated than any other financial goal, or if the desired annual income of the investor is greater than or equal to a threshold (e.g., 6% of the initial assets of the investor), the financial strategy in the first subset having the highest initial monthly income is selected. If two or more financial strategies in the first subset are tied for the highest initial monthly income, the financial strategy having the highest utility score is selected. If financial goal 31 (achieve income level) is not rated more highly than any other financial goal and if the desired annual income of the investor is less than the threshold, the financial strategy in the first subset having the highest utility score is selected. Hence, the first financial strategy is selected with the first heuristic.

For the second heuristic, the second subset of the financial strategies initially has all the financial strategies, and three restrictive decisions for the second subset are made. The first restrictive decision of the second heuristic is based on the first financial strategy. In particular, if the first financial strategy has a product mix other than 100% mutual funds and 0% variable annuities, the first restrictive decision of the second heuristic includes in the second subset only the financial strategies having a product mix of 100% mutual funds and 0% variable annuities. On the other hand, if the first financial strategy has a product mix of 100% mutual funds and 0% variable annuities, the first restrictive decision of the second heuristic does not remove any financial strategies from the second subset.

For the second and third restrictive decisions, the second subset is restricted as in the second and third restrictive decisions for the first heuristic. From the derived second subset of financial strategies, the financial strategy having the highest utility score is selected as the second financial strategy. If the selected financial strategy is the same as the first financial strategy, the financial strategy having the second highest utility score is selected as the second financial strategy. Hence, the second financial strategy is selected with the second heuristic.

For the third heuristic, the third subset of the financial strategies initially has all the financial strategies, and two restrictive decisions for the third subset are made. The first and second restrictive decisions of the third heuristic are almost the same as the second and third restrictive decisions of the first heuristic, respectively. With the third heuristic, however, more financial strategies are maintained in the third subset than in the first subset by not removing as many financial strategies as with the first heuristic. For example, applying the third restrictive decision for the first heuristic to the third heuristic, if financial goal 33 (achieve income certainty) is rated as 10 in the questionnaire of FIG. 8, financial strategies having a likelihood of success of less than 85% are removed from the third subset, and if financial goal 33 (achieve income certainty) is rated as 9, financial strategies having a likelihood of success of less than 75% are removed from the third subset.

From the third subset of financial strategies, the third financial strategy is chosen. The financial strategy in the third subset having the highest initial monthly income is selected as the third financial strategy. If two or more financial strategies in the third subset are tied for the highest initial monthly income, the financial strategy having the highest utility score is selected as the third financial strategy. However, the third financial strategy cannot be the same as the first or the second financial strategy. If the selected financial strategy (having the highest utility score) is the same as the first or second financial strategy, the financial strategy having the second highest utility score is selected as the third financial strategy. If the selected financial strategy (having the second highest utility score) is the same as the first or second financial strategy, the financial strategy having the third highest utility score is selected as the third financial strategy. Hence, the third financial strategy is selected with the third heuristic.

Investor Recommendations

In block 10 of FIG. 1, investor recommendations are provided to the investor via a report. Using the one or more selected strategies from block 9, the selected financial strategies are presented to the investor in an automatically generated report. The report has three functions. First, the report informs the investor of the crucial data and results relevant to the investor. Second, the report educates the investor about the nature of the analysis performed. Third, the report advises the investor on the appropriate one or more strategies to be considered.

The report provides various types of information to the investor. The report recapitulates the investor financial preferences, investor assets, and investor personal data as entered on the questionnaire in block 3. Information from the questionnaire filled in with the investor's answers, such as the one illustrated in FIG. 8, is included in the report. The report includes information used by the projection engine, such as the financial period. The report explains how the investor recommendations were developed, and includes discussions of MAUT decision analysis and Monte Carlo simulations. The report explains the financial variables used to develop the financial strategies. For example, the report explains the financial variables of asset allocation, product mix, and likelihood of success. As an option, the report explains any features of the financial strategies, such as MRDs, tax assumptions, and portfolio migrations.

The report presents one or more financial strategies. For instance, the report presents the financial strategy having the highest utility score and additional financial strategies as discussed above for block 9 in FIG. 1, including the financial strategy satisfying the desired monthly income of the investor entered on the questionnaire.

The report contains information from the Monte Carlo simulations for each recommended strategy. This information can be presented in tabular or graphical form as illustrated in FIGS. 9 and 13-17. FIGS. 13-17 continue the example illustrated in FIGS. 8-12.

FIG. 13 illustrates a table of projected monthly and annual incomes for a selected financial strategy. The financial strategy illustrated is the highest ranked strategy and corresponds to cell 85 in FIG. 12. The table contains three columns 90-92. Column 90 is the simulated year. Column 91 is the projected monthly income for the investor for a simulated year, and the entries for column 91 are supplied by the simulated annual values from the Monte Carlo simulations for the measure of attribute 40 in FIG. 7A. Column 92 is the projected annual income for the investor for the simulated year, and the entries for column 92 are calculated by multiplying the non-rounded values from column 91 by 12, the number of months in a year.

FIG. 14 illustrates a table of projected starting and ending balances for three Monte Carlo simulations for a selected financial strategy. The financial strategy illustrated is the highest ranked strategy and corresponds to cell 85 in FIG. 12. The table has seven columns 93-99 Column 93 is the simulated year. Columns 94 and 95 are the starting and ending balances, respectively, for a low-range scenario. Columns 96 and 97 are the starting and ending balances, respectively, for a median scenario. Columns 98 and 99 are the starting and ending balances, respectively, for a high-range scenario. The median scenario is the $250^{th}$ scenario out of the 500 scenarios, ranked in order of ending balance. The low-range scenario is the median scenario from the bottom $25^{th}$ percentile of the 500 scenarios. The high range scenario is the median scenario from the top $25^{th}$ percentile of the 500 scenarios. For FIG. 14, the entries in columns 94-99 are the total assets for the simulated year and are supplied from the calculations of attribute 50 in FIG. 7A. The starting balance for each of the three scenarios in columns 94, 96, and 98 is the same for simulated year 2003. The ending balance for a simulated year in columns 94, 96, and 98 is the starting balance for the next simulated year in columns 95, 97, and 99, respectively. The low-range scenario ran out of assets before the end of the financial period, namely in simulated year 2021.

FIG. 15 illustrates a table of portfolio migration for a selected financial strategy. The financial strategy illustrated is the highest ranked strategy and corresponds to cell 85 in FIG. 12. If portfolio migration is a feature of the financial strategies, a table such as the one illustrated in FIG. 15 is included in the report. FIG. 15 has seven columns 100-106. Column 100 is the simulated year in which a change to the portfolio occurred. The table is split according to the product mix, mutual funds in columns 101-103 and variable annuities in columns 104-106. For the mutual funds, the asset allocation is divided into stocks in column 101, bonds in column 102, and short-term securities in column 103. For the variable annuities, the asset allocation is divided into stocks in column 104, bonds in column 105, and short-term securities in column 106. Each entry in columns 101-106 corresponds to the percentage of the type of asset. For each simulated year, the sum of the entries in columns 101-103 is 100%, and the sum of the entries in columns 104-106 is 100%. For the simulated financial strategy, portfolio migration occurred in simulated years 2008, 2013, 2018, and 2023.

If two or more financial strategies are selected for the investor, the report includes a comparison of the financial strategies. FIG. 16 illustrates a table comparing the selected financial strategies. Each column 110-113 of the table presents the results for one of the four financial strategies. Column 110 presents the results for the financial strategy having the highest utility score and corresponds to cell 85 in FIG. 12. Column 111 presents the results for the financial strategy having the second highest utility score and corresponds to cell 86 in FIG. 12. Column 112 presents the results for the financial strategy having the third highest utility score and corresponds to cell 87 in FIG. 12. Column 113 presents the results for the financial strategy having the highest likelihood of achieving the desired monthly income indicated by the investor on the questionnaire and corresponds to cell 88 in FIG. 11. Alternatively, other heuristics could be used to determine the strategies presented in columns 111 and 112.

In FIG. 16, each column 110-113 has 10 rows 114-123. Row 114 is the initial monthly income for the financial strategy and corresponds to value 82 in FIGS. 11 and 12. The initial monthly income is presented because the monthly incomes of later simulation years vary due to inflation considerations. Row 115 is the simulation success rate for achieving the initial monthly income and corresponds to value 84 in FIGS. 11 and 12. Rows 116 and 117 indicate the product mix financial variable for the financial strategy. Row 116 is the percentage of mutual funds in the product mix, and row 117 is the percentage of variable annuities in the product mix. Rows 118-120 indicate the asset allocation financial variable for the mutual funds for the financial strategy. For the mutual funds, row 118 is the percentage of stocks, row 119 is the percentage of bonds, and row 120 is percentage of short-term securities. Rows 121-123 indicate the asset allocation financial variable for the variable annuities for the financial strategy. For the variable annuities, row 121 is the percentage of stocks, row 122 is the percentage of bonds, and row 122 is percentage of short-term securities. If the percentage of variable annuities is 0%, no percentages are indicated for rows 121-123. For example, for column 113, the percentage of variable annuities is 0%, and no percentages are indicated for rows 121-123.

FIG. 17 illustrates a table for implementing the selected financial strategies. To assist the investor in implementing one or more selected strategies, the report describes how to implement the selected financial strategies using specific mutual funds and variable annuities. The report describes various recommended mutual funds and variable annuities to implement the selected financial strategies. As in FIG. 16, the selected financial strategies are presented in a side-by-side comparison of the various mutual funds and annuities.

The report may be partitioned into a first report and a second report. The first report describes the selected one or more financial strategies and how the selected financial strategies were determined, and the second report describes how to implement the selected one or more financial strategies using specific mutual funds and variable annuities.

In the report, various types of information are presented for the investor in various formats. FIGS. 9 and 13-17 illustrate some of the possibilities for presenting the information to the investor. Other possibilities include any of the quantities used to determine the utility scores for the investment strategies.

The report is conveyed to the investor on an information storage device. The information storage device for the report can be the same or different from the information storage device used by the questionnaire in block 3 of FIG. 1. For an information storage device in paper form, the report is printed on paper. For an information storage device in electronic form, the report is embodied in a computer-readable medium and provided to the investor, for example, via the mail or electronically over a network.

The report for the investor is generated automatically. A software-implemented form for the report is stored on a computer-readable medium and has variables to be filled-in by document creating software. The report for the investor is generated using the document creating software and the software-implemented form. The results from the Monte Carlo simulations in blocks 5 and 7, the one or more selected financial strategies in block 9, and information from the questionnaire for the investor in block 3 are supplied to the document creating software. The document creating software uses this information to fill in the variables in the software-implemented form to create the report for the investor. As an option, the variables in the basic software-implemented report are presented in the report for the investor as tables and graphs as illustrated in FIGS. 9 and 13-17.

Operation of the Invention

FIG. 17 illustrates a flow diagram for the operation of the invention. In block 130, the financial strategies are determined as per block 1 in FIG. 1.

In block 131, the MUF is determined as per block 2.

In block 132, the investor input is obtained using the questionnaire as per block 3, and the investor financial preferences from the questionnaire of block 3 are used with the MUF from block 2 to develop a preference model as per block 4.

In block 133, an outcome for each financial strategy is determined. In block 5, the projection engine uses the financial strategies from block 1, the time series database from block 6, and the investor input from block 3 to perform Monte Carlo simulations for the financial strategies. Using the results from the Monte Carlo simulations and the MUF from block 2, measures for each attribute for each financial strategy are determined in block 7. The outcome for a financial strategy refers to any of the information generated from the Monte Carlo simulations in block 5 and the measures calculated from the Monte Carlo simulations in block 7.

In block 134, at least one financial strategy is selected as per blocks 8 and 9. The attribute measures from block 7 and the preference model from block 4 are used to obtain a utility score for each financial strategy in block 8. In block 9, the financial strategies are ranked, and at least one financial strategy is selected.

In block 135, the investor is informed as to the one or more selected financial strategies via a report as per block 10. The report is created, is provided to the investor, and describes how to interpret and implement the one or more selected financial strategies.

The invention is preferably implemented with a PC running Windows by Microsoft of Redmond, Wash. using: Delphi 3.0 by Inprise of Scotts Valley, Calif. for the basic software for implementing the invention; LDW by Logical Decisions Inc. of Boulder, Colo. to determine the equations of the preference model; Word Basic and Word by Microsoft to generate the selected financial strategies; Access by Microsoft to maintain a database of annuity factors; Quote-Calc.DLL by Security Benefit Group of Topeka, Kans. to determine initial annuity payments; and Word by Microsoft to generate the report. As those skilled in the art will recognize, the invention can be implemented using a large variety of computers and software.

The invention has been described in detail with respect to preferred embodiments, and it will now be apparent from the foregoing to those skilled in the art, that changes and modifications may be made without departing from the invention in its broader aspects, and the invention, therefore, as defined in the claims is intended to cover all such changes and modifications as follows in the true spirit of the invention.

What is claimed is:

1. A computer-implemented method for selecting at least one financial strategy from a plurality of financial strategies to achieve at least one financial goal, each financial strategy comprising an asset allocation, comprising the steps of:

receiving at a computer investor financial preferences regarding a plurality of attributes for at least one financial goal;

performing within the computer a plurality of Monte Carlo simulations on the asset allocation of each financial strategy based on a probability distribution;

generating rates of return within the computer for each respective financial strategy based on the Monte Carlo simulations;

calculating financial projections for each financial strategy based on the rates of return for each respective financial strategy;

calculating a plurality of attribute measures for each financial strategy based on the financial projections for each respective financial strategy, the plurality of attribute measures corresponding to the plurality of attributes for the at least one financial goal;

calculating a utility score for each financial strategy based on the plurality of the attribute measures for each respective financial strategy and the investor financial preferences regarding the plurality of attributes for the at least one financial goal; and selecting at least one of the financial strategies from the plurality of financial strategies by the computer based on the utility scores for the plurality of financial strategies.

2. A computer-implemented method according to claim 1, further comprising: storing the rates of return in a time series database of rates of return for each of the financial strategies.

3. A computer-implemented method according to claim 1, wherein the step of calculating a utility score comprises using a software-implemented decision analysis based on multi-attribute utility theory.

4. A computer-implemented method according to claim 1, wherein selecting at least one of the financial strategies comprises the step of selecting the financial strategy having a highest utility score.

5. A computer-implemented method according to claim 3, further comprising:
   calculating a goals hierarchy for the at least one financial goal;
   calculating a single utility function for each attribute of the at least one financial goal;
   calculating a weight for each attribute; and
   calculating a weight for each of the at least one financial goal;
wherein the utility score for each financial strategy is calculated based on the single-utility functions, the weights for the attributes, and the weights for the financial goals.

6. A computer-implemented method according to claim 5, wherein the at least one financial goal, the attributes, the single utility functions, and the weights for the attributes are calculated using input provided by a financial planner.

7. A computer-implemented method according to claim 5, wherein the weight for the at least one financial goal is calculated using the investor financial preferences, input provided by a financial planner, or a combination of financial preferences provided by an investor and input provided by a financial planner.

8. A computer-implemented method according to claim 1, wherein receiving investor financial preferences comprises the step of receiving financial preferences provided by an investor.

9. A computer-implemented method according to claim 1, wherein receiving investor financial preferences comprises the step of receiving input provided by a financial planner.

10. A computer-implemented method according to claim 1, wherein receiving investor financial preferences comprises the step of receiving a combination of financial preferences provided by an investor and input provided by a financial planner.

11. A computer-implemented method according to claim 1, wherein selecting at least one of the financial strategies comprises the step of selecting a financial strategy using a heuristic based on investor financial preferences.

12. A computer-implemented method according to claim 1, wherein selecting at least one of the financial strategies comprises the step of selecting a financial strategy using a heuristic based on financial variables related to the financial strategies.

13. A computer-implemented method according to claim 1, wherein selecting at least one of the financial strategies comprises the step of selecting a financial strategy using a heuristic based on investor financial preferences, financial variables related to the financial strategies, and utility scores determined for the financial strategies.

14. A computer-implemented method according to claim 1, wherein each financial strategy is selected from a multi-dimensional matrix of at least one financial variable and stored on a computer-readable medium, the multi-dimensional matrix having a plurality of cells, each cell in the multi-dimensional matrix corresponding to one of the financial strategies.

15. A computer-implemented method according to claim 1, wherein each financial strategy further comprises a product mix and a likelihood of success for achieving at least one of an investment of assets, an accumulation of assets, or a withdrawal of assets.

16. A computer-implemented method according to claim 1, wherein the asset allocation comprises an allocation of at least one of stocks, bonds, or short-term securities.

17. A computer-implemented method according to claim 15, wherein the product mix comprises a mix of at least one of a mutual fund or a variable annuity.

18. A computer-implemented method according to claim 1, wherein at least one financial strategy includes at least one of the following: periodic withdrawal; inflation adjustment; minimal required distributions; an ordered withdrawal strategy based on tax characteristics of the assets; an ordered annuity purchase strategy based on tax characteristics of the assets; periodic tax adjustment; periodic shifting of asset allocations; periodic rebalancing of assets to align with a current asset allocation; re-investment of excess annuity payments; reinvestment of excess minimal required distributions; investor contributions; asset management fees; staggered investor account starts; or MRD mortality rules.

19. A computer-implemented method according to claim 1, wherein the at least one financial goal is related to retirement financial goals.

20. A computer-implemented method according to claim 1, further comprising the step of providing a questionnaire for an investor, the questionnaire for receiving investor financial preferences.

21. A computer-implemented method according to claim 1, further comprising the step of creating a report describing the step of selecting at least one of the financial strategies and the selected at least one of the financial strategies.

22. A computer-readable medium having computer-executable instructions that when executed by a computer, selects at least one financial strategy from a plurality of financial strategies to achieve at least one financial goal, each financial strategy comprising an asset allocation, the computer-readable medium comprising:
   instructions that when executed by the computer, receives investor financial preferences regarding a plurality of attributes for at least one financial goal;
   instructions that when executed by the computer, performs a plurality of Monte Carlo simulations on the asset allocation of each financial strategy based on a probability distribution;
   instructions that when executed by the computer, generates rates of return for each respective financial strategy based on the Monte Carlo simulations;
   instructions that when executed by the computer, calculates financial projections for each financial strategy based on the rates of return for each respective financial strategy;
   instructions that when executed by the computer, calculates a plurality of attribute measures for each financial strategy based on the financial projections for each respective financial strategy, the plurality of attribute measures corresponding to the plurality of attributes for the at least one financial goal;
   instructions that when executed by the computer, calculates a utility score for each financial strategy based on the plurality of the attribute measures for each respective financial strategy and the investor financial preferences regarding the plurality of attributes for the at least one financial goal; and instructions that when executed by the computer, selects at least one of the financial strategies from the plurality of financial strategies based on the utility scores for the plurality of financial strategies.

23. A computer system for selecting at least one financial strategy from a plurality of financial strategies to achieve at least one financial goal, each financial strategy comprising an asset allocation, the computer system comprising:

means for receiving investor financial preferences regarding a plurality of attributes for at least one financial goal;

means for performing a plurality of Monte Carlo simulations on the asset allocation of each financial strategy based on a probability distribution;

means for generating rates of return for each respective financial strategy based on the Monte Carlo simulations;

means for calculating financial projections for each financial strategy based on the rates of return for each respective financial strategy;

means for calculating a plurality of attribute measures for each financial strategy based on the financial projections for each respective financial strategy, the plurality of attribute measures Corresponding to the plurality of attributes for the at least one financial goal;

means for calculating a utility score for each financial strategy based on the plurality of the attribute measures for each respective financial strategy and the investor financial preferences regarding the plurality of attributes for the at least one financial goal; and means for selecting at least one of the financial strategies from the plurality of financial strategies based on the utility scores for the plurality of financial strategies.

24. A computer system for selecting at least one financial strategy for assets to meet financial goals, the computer system comprising:

means for storing investor information regarding a plurality of attributes for at least one financial goal;

means for storing a plurality of financial strategies, each financial strategy including an asset allocation;

means for performing a plurality of Monte Carlo simulations on the asset allocation of each financial strategy based on a probability distribution;

means for generating rates of return for each respective financial strategy based on the Monte Carlo simulations;

a software-implemented projection engine that calculates financial projections for each of the financial strategies using the rates of return;

means for calculating a plurality of attribute measures for each financial strategy based on the financial projections for each respective financial strategy, the plurality of attribute measures corresponding to the plurality of attributes for the at least one financial goal;

a software-implemented preference model incorporating the investor information;

means for calculating a utility score for each of the financial strategies using the preference model and the plurality of attributes measures for each respective financial strategy; and means for selecting at least one of financial strategies based on the utility scores for the financial strategies.

25. A computer-readable medium having computer-executable instructions that when executed by a computer, selects at least one financial strategy for assets to meet financial goals, the at least one financial strategy including an asset allocation, the computer-readable medium comprising:

instructions that when executed by the computer, receives investor financial preferences regarding a plurality of attributes for at least one financial goal;

instructions that when executed by the computer, performs a plurality of Monte Carlo simulations on the asset allocation of each financial strategy based on a probability distribution;

instructions that when executed by the computer, generates rates of return for each respective financial strategy based on the Monte Carlo simulations;

instructions that when executed by the computer, calculates financial projections for each financial strategy based on the rates of return for each respective financial strategy;

instructions that when executed by the computer, calculates a plurality of attribute measures for each financial strategy based on the financial projections for each respective financial strategy, the plurality of attribute measures corresponding to the plurality of attributes for the at least one financial goal;

instructions that when executed by the computer, calculates a utility score for each financial strategy based on the plurality of the attribute measures for each respective financial strategy and the investor financial preferences regarding the plurality of attributes for the at least one financial goal; and instructions that when executed by the computer, selects at least one of the financial strategies from the plurality of financial strategies based on the utility scores for the plurality of financial strategies.

26. A computer-implemented method according to claim 1, wherein the at least one financial goal includes college tuition financial goals.

27. A computer system according to claim 23, wherein the at least one financial goal is related to retirement financial goals.

28. A computer-readable medium according to claim 25, wherein at least one financial strategy includes at least one of the following: periodic withdrawal; inflation adjustment; minimal required distributions; an ordered withdrawal strategy based on tax characteristics of the assets; an ordered annuity purchase strategy based on tax characteristics of the assets; periodic tax adjustment; periodic shifting of asset allocations; periodic rebalancing of assets to align with a current asset allocation; re-investment of excess annuity payments; reinvestment of excess minimal required distributions; investor contributions; asset management fees; staggered investor account starts; or MRD mortality rules.

29. A computer-implemented method according to claim 1, wherein generating rates of return for each respective financial strategy comprises:

constructing a covariance matrix for the asset allocation of each respective financial strategy based on each of a plurality of sub-asset classes of the asset allocation of each financial strategy;

calculating deviations for a zero rate of return obtained from the plurality of Monte Carlo simulations; and combining the covariance matrix for the asset allocation, deviations for a zero rate of return obtained from the plurality of Monte Carlo simulations, and an average rate of return for each sub-asset class to obtain the rates of return for each respective financial strategy.

30. A computer-implemented method according to claim 1, wherein performing a plurality of Monte Carlo simulations comprises: for each of a plurality of sub-asset classes of the asset allocation of each financial strategy, calculating a probability distribution for the sub-asset class based on at least one of historical data of the sub-asset class or input provided by a financial planner.

31. A computer-implemented method according to claim 1, wherein the probability distribution is a Gaussian probability distribution.

32. A computer-implemented method according to claim 1, wherein selecting at least one of the financial strategies comprises the step of selecting a financial strategy which does not have a highest utility score.

* * * * *